(12) United States Patent
Mueller et al.

(10) Patent No.: US 12,737,155 B2
(45) Date of Patent: Sep. 15, 2026

(54) HARDWARE-BASED GALOIS MULTIPLICATION

(71) Applicant: International Business Machines Corporation, Armonk, NY (US)

(72) Inventors: Silvia Melitta Mueller, St. Ingbert (DE); Debapriya Chatterjee, Austin, TX (US); Maarten J. Boersma, Holzgerlingen (DE); Martijn Diede Berkers, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 1072 days.

(21) Appl. No.: 17/884,777

(22) Filed: Aug. 10, 2022

(65) Prior Publication Data

US 2024/0053963 A1 Feb. 15, 2024

(51) Int. Cl.
*G06F 7/72* (2006.01)

(52) U.S. Cl.
CPC .............. *G06F 7/724* (2013.01); *G06F 7/722* (2013.01)

(58) Field of Classification Search
CPC ....... H04L 9/0637; H04L 9/0643; G06F 7/72; G06F 7/722; G06F 7/724; G06F 7/7284
See application file for complete search history.

(56) References Cited

U.S. PATENT DOCUMENTS 7,295,671 B2 11/2007 Snell
7,702,100 B2 4/2010 Han
7,783,037 B1 8/2010 Bong
8,042,025 B2 10/2011 Gopal
8,194,854 B2 6/2012 Gueron
8,340,280 B2 12/2012 Gueron
8,913,740 B2 12/2014 Gueron
10,129,018 B2 11/2018 Satpathy
(Continued)

FOREIGN PATENT DOCUMENTS

CN 1658550 A 8/2005
CN 112152785 A 12/2020
(Continued)

OTHER PUBLICATIONS

Adams, A. et al., "Cryptography Acceleration in a Risc-V GPGPU," CARRV 2021, Jun. 17, 2021, 7 pages.
(Continued)

*Primary Examiner* — Matthew D Sandifer
(74) *Attorney, Agent, or Firm* — CANTOR COLBURN LLP; Edward Wixted

(57) ABSTRACT

A processor includes an instruction fetch unit that fetches instructions to be executed, an architected register file including a plurality of registers for storing source and destination operands, and an execution unit for executing a Galois multiply instruction. The execution unit includes a carryless multiplier configured to multiply operands of the Galois multiply instruction to generate a product. The execution unit further includes a modular reduction circuit configured to receive the product and determine, based on a logical combination of the product and a fixed polynomial, a reduced product having a fewer number of bits than the product. The execution unit is configured to store the reduced product to the architected register file as a result of the Galois multiply instruction.

20 Claims, 15 Drawing Sheets

(56) References Cited

U.S. PATENT DOCUMENTS 10,142,098 B2 11/2018 Suresh
10,256,971 B2 4/2019 Gueron
10,305,680 B2 5/2019 Gomes
10,313,108 B2 6/2019 Suresh
10,346,343 B2 7/2019 Suresh
10,348,506 B2 7/2019 Greiner
10,432,393 B2 10/2019 Gueron
10,496,373 B2 * 12/2019 Suresh .................... G06F 7/523
10,581,593 B2 3/2020 Gomes
10,877,753 B2 12/2020 Bradbury
10,924,282 B2 2/2021 Brostrom
11,121,856 B2 9/2021 Satpathy
11,128,443 B2 9/2021 Gueron
2002/0066014 A1 5/2002 Dworkin
2004/0202317 A1 10/2004 Demjanenko
2004/0252831 A1 12/2004 Uehara
2004/0255130 A1 12/2004 Henry
2005/0089160 A1 4/2005 Crispin
2008/0240423 A1 * 10/2008 Gueron ................. H04L 9/3242 380/28
2008/0240426 A1 10/2008 Gueron et al.
2009/0052659 A1 2/2009 Gueron
2009/0141887 A1 6/2009 Yap
2009/0310775 A1 * 12/2009 Gueron ................. H04L 9/0643 380/28
2010/0049986 A1 2/2010 Watanabe
2010/0070548 A1 * 3/2010 Gashkov ................. G06F 7/724 708/492
2010/0306293 A1 * 12/2010 Li .......................... G06F 7/724 708/492
2011/0060782 A1 * 3/2011 Moharil .................. G06F 7/724 708/492
2011/0231636 A1 9/2011 Olson
2011/0255689 A1 10/2011 Bolotov
2014/0208079 A1 * 7/2014 Bradbury ............ G06F 9/30036 712/222
2015/0043729 A1 2/2015 Gopal
2015/0067302 A1 * 3/2015 Gueron ................. G06F 9/3887 712/210
2015/0098563 A1 4/2015 Gulley
2016/0119126 A1 4/2016 Shay
2017/0134163 A1 5/2017 Suresh
2017/0373836 A1 12/2017 Rarick
2018/0122271 A1 5/2018 Ghosh
2018/0365021 A1 * 12/2018 Chen ..................... G06F 9/3897
2019/0197821 A1 6/2019 Hutchinson-Kay et al.
2019/0205093 A1 * 7/2019 Suresh .................... G06F 7/722
2019/0286443 A1 9/2019 Solomatnikov et al.
2019/0319782 A1 10/2019 Ghosh
2019/0386815 A1 12/2019 Satpathy
2020/0117811 A1 4/2020 Ghosh et al.
2020/0134234 A1 4/2020 Lemay
2021/0152330 A1 5/2021 Satpathy
2021/0203504 A1 7/2021 Brandt
2022/0206958 A1 6/2022 LeMay
2023/0269076 A1 8/2023 Brandt
2024/0012811 A1 1/2024 Dai et al.
2024/0015004 A1 1/2024 Chatterjee et al.
2024/0053989 A1 2/2024 Kumar et al.
2024/0061961 A1 2/2024 Kumar et al.

FOREIGN PATENT DOCUMENTS

EP 4569404 A1 6/2025
EP 4569724 A1 6/2025
EP 4569725 A1 6/2025
TW 200536331 A 11/2005
TW 200845689 A 11/2008
TW 201203108 A 1/2012
TW 201332329 A 8/2013
TW 201519623 A 5/2015
TW 201636829 A 10/2016
TW 201717573 A 5/2017
TW 202201165 A 1/2022

OTHER PUBLICATIONS

Advanced Encryption Standard (AES), Nov. 26, 2001, pp. 1-51, FIPS Pub 197, National Institute of Standards and Technology (NIST), US.

Anonymous, "Method of Early Detection and Halting of Ransomware Attacks," IPCOM000268682D, IP.com, Feb. 15, 2022, 5 pages.

Anonymous, "A Method To Reduce Stick Table Synchronization Storm Among Load Balancer Cluster," IPCOM000268809D, Mar. 1, 2022, 6 pages, IP.com.

Anonymous, "Method and System for Prevention of Anti-Tampering of Media Content," IPCOM000259235D, Jul. 22, 2019, 4 pages, IP.com.

Anonymous, "Method of Flash Acceleration in Replication for Consistent Hash Ring," Mar. 13, 2016, 9 pages, IPCOM000245503D, Ip.com.

Anonymous, "Parallelizable Hashing Algorithm," IPCOM000254123D, Jun. 4, 2018, 2 pages, IP.com.

Bos, J.W. et al., Performance Analysis of the SHA-3 Candidates On Exotic Multi-Core Architectures, CHES 2010 12th International Workshop, Aug. 17-20, 2010, 15 pages, Santa Barbara, CA.

Ghosh, Moinak, "Optimizing Rolling Hash Computation Using SIMD Vector Registers," IPCOM000226555D, Apr. 16, 2013, 4 pages, IP.com.

Gulley, S. et al., "Intel Sha Extensions: New Instructions Supporting the Secure Hash Algorithm on Intel Architecture Processors," Jul. 2013, 22 pages, Intel Corporation.

Jang, K. et al., "SSL Shader: Cheap SSL Acceleration With Commodity Processors," 8th USENIX Symposium on Networked Systems Design and Implementation, Mar. 2011, 14 pages, USENIX Association, Boston, MA.

Keller, S. et al., "Secure Hash Algorithm 3 Validation System (SHA3VS)," Jan. 29, 2016, 33 pages, National Institute of Standards and Technology, USA.

NIST FIPS 180-4 "Secure Hash Standard," Aug. 2015, 37 pages, National Institute of Standards and Technology, Gaithersburg, MD.

NIST FIPS 202 "SHA-3 Standard: Permutation-Based Hash and Extendable-Output Functions," Aug. 2015, 37 pages, National Institute of Standards and Technology, Gaithersburg, MD.

Salehani, Y. et al., "NESHA-256, New 256-BIT Secure Hash Algorithm," Cryptology ePrint Archive, Paper 2009/033, 2009, 16 pages, https://eprint.iacr.org/2009/033.

Appendix P, List of IBM Patents or Patent Applications Treated as Related, 2 pages.

International Searching Authority of European Patent Office, International Search Report and Written Opinion, International Application No. PCT/EP2023/068147, Oct. 4, 2023, 14 pages.

TW IPO, Notice of Allowance for P202301322TW01, Sep. 26, 2024, 6 pages (English translation).

Bertoni, Guido et al., "KangarooTwelve: fast hashing based on Keccak-p." IACR Cryptology ePrint Archive (2018), 19 pages.

Dworkin, M., "SHA-3 Standard: Permutation-Based Hash and Extendable-Output Functions NIST FIPS 202," Aug. 2015, 37 pages, National Institute of Standards and Technology, Gaithersburg, MD.

Y. Akiya et al., "SHA-3-LPHP: Hardware Acceleration of SHA-3 for Low-Power High-Performance Systems," 2021 IEEE International Symposium on Software Reliability Engineering Workshops (ISSREW), Wuhan, China, 2021, pp. 393-398, doi: 10.1109/ISSREW53611.2021.00107.

P202201607TW01 Office Action, Jul. 1, 2024, 4 pages, TW Patent Office (English Translation).

International Searching Authority, Notification of Transmittal of the International Search Report and the Written Opinion of the International Searching Authority, Nov. 11, 2023, 12 pages, International Application No. PCT/EP2023/071370.

International Searching Authority, Notification of Transmittal of the International Search Report and the Written Opinion of the International Searching Authority, Nov. 6, 2023, 12 pages, International Application No. PCT/EP2023/071369.

(56) References Cited

OTHER PUBLICATIONS

Pittalia, P. P. (2019), A comparative study of hash algorithms in cryptography, International Journal of Computer Science and Mobile Computing, 8(6), 147-152 (2019).
Rachh, Rashmi, et al., "Implementation of AES Key Schedule Using Look-Ahead Technique," Circuits, Systems, and Signal Processing 33.11(2014): 3663-3670.
TW IPO, Office Action for P202201845TW01, Jan. 24, 2024, 9 pages.
Taiwan Intellectual Property Bureau, Notice of Allowance in P202201845TW01 (English translation), Aug. 23, 2024, 6 pages.
Taiwan IPO, P202201322TW01 Office Action, Jun. 14, 2024, 20 pages (English Translation).
Taiwan IPO, P202201845TW01 Office Action, Jun. 12, 2024, 4 pages (English Translation).
Dworkin, M., "Recommendation for Block Cipher Modes of Operation: Galois/Counter Mode (GCM) and GMAC," Nist Special Publication SP800-38D, Nov. 2007, 39 pages, National institute for Standards and Technology, Gaithersburg, MD.
Gueron, S. et al., "Intel Carry-Less multiplication instruction and its usage for computing GCM Mode," May 2010, 76 pages, Intel Corporation.
IEEE standard: 1619-2018, "IEEE Standard for Cryptographic Protection of Data on Block-Oriented Storage Devices," Oct. 23, 2018, 41 pages, IEEE, New York, NY.
McGrew, D. et al., "The Galois/Counter Mode of Operation," Feb. 2004, 43 pages.
International Searching Authority of European Patent Office, International Search Report and Written Opinion, International Application No. PCT/EP2023/071362, Oct. 18, 2023, 13 pages.
Y. Chen et al., "A programmable Galois Field processor for the Internet of Things," 2017 ACM/IEEE 44th Annual International Symposium on Computer Architecture (ISCA), Toronto, ON, Canada, 2017, pp. 55-68, doi: 10.1145/3079856.3080227.

* cited by examiner

HARDWARE-BASED GALOIS MULTIPLICATION

BACKGROUND OF THE INVENTION

The present invention relates in general to data processing and, in particular, to Galois multiplication.

An important aspect of data security is the protection of data at rest (e.g., while stored in a data storage device) or data in transit (e.g., during transmission) through encryption. Generally speaking, encryption involves the conversion of unencrypted data (referred to as plaintext) to encrypted data (referred to as ciphertext) through the combination of the plaintext and one or more encryption keys utilizing an encryption function. To recover the plaintext from the ciphertext, the ciphertext is processed by a decryption function utilizing one or more decryption keys. Thus, encryption provides data security by requirement that an additional secret (i.e., the decryption key(s)) be known by a party prior to that party being able to access the protected plaintext.

In many implementations, data encryption is performed utilizing software executing on a general purpose processor. While the implementation of encryption in software provides the advantages of being able to select differing encryption functions and easily adapting a selected encryption algorithm to use various lengths of plaintext and encryption keys, performing encryption in software has the concomitant disadvantage of relatively poor performance. As the volumes of data sets continue to dramatically increase in the era of "big data," the performance achieved by software-implemented encryption can be unacceptable when encrypting large data sets. Accordingly, it is often desirable to provide support for encryption in hardware to achieve improved performance.

Another prior art solution particularly applicable to disk encryption is the implementation of a physical encryption engine connected to the memory hierarchy. Compared to a hardware solution in a processor core, a physical encryption engine coupled to the memory hierarchy can be more expensive to implement. Further, such solutions are usually not applicable to data in flight.

BRIEF SUMMARY

The present disclosure appreciates that multiple commonly used encryption functions, such as AES (Advanced Encryption Standard)-GCM (Galois Counter Mode) and AES-XTS (XEX-based tweaked-codebook mode with ciphertext stealing), utilize Galois multiplication (i.e., carryless multiplication and modular reduction) to logically combine encryption operands. For example, AES-GCM and AES-XTS both use a Galois multiplication in the GF(2^128) field defined by the fixed polynomial g(x)=1+X+x^2+x^7+x^128. In AES-GCM, Galois multiplications are used to generate a signature for an encrypted message, which can be utilized during decryption to detect whether the ciphertext or signature has been tampered with. In AES-XTS, the Galois multiplications are employed as part of the encryption and decryption of the message itself. The present disclosure discloses various embodiments of circuits for implementing Galois multiplication in hardware and an associated Galois multiplication instruction.

In one embodiment, a processor includes an instruction fetch unit that fetches instructions to be executed, an architected register file including a plurality of registers for storing source and destination operands, and an execution unit for executing a Galois multiply instruction. The execution unit includes a carryless multiplier configured to multiply operands of the Galois multiply instruction to generate a product. The execution unit further includes a modular reduction circuit configured to receive the product and determine, based on a logical combination of the product and a fixed polynomial, a reduced product having a fewer number of bits than the product. The execution unit is configured to store the reduced product to the architected register file as a result of the Galois multiply instruction.

In some embodiments, the processor can form part of a larger data processing system or can be implemented as a design structure embodied in a machine-readable storage device.

According to one method of data processing, an instruction fetch unit of a processor fetches instructions to be executed by the processor, including a Galois multiply instruction. Based on receiving the Galois multiply instruction, an execution unit of the processor executes the Galois multiply instruction. Executing the Galois multiply instruction includes multiplying, by a carryless multiplier, operands of the Galois multiply instruction to generate a product. Executing the instruction further includes a modular reduction circuit receiving the product and determining, based on a logical combination of the product and a fixed polynomial, a reduced product having a fewer number of bits than the product. The processor then stores the reduced product to an architected register file of the processor as a result of the Galois multiply instruction.

In at least one embodiment, the fixed polynomial is g(x)=1+X+x^2+x^7+x^128.

In at least one embodiment, the product of the carryless multiplication includes a high part including high-order bits of the product and a low part including low-order bits of the product, and the modular reduction circuit is configured to compute a first result equivalent to a carryless multiplication of the high part and the fixed polynomial. The modular reduction circuit includes shift circuitry that applies multiple different bit position shifts to the high part of the product consistent with asserted bits in the fixed polynomial and bitwise exclusive OR (XOR) circuitry that logically combines multiple instances of the high part of the product having different respective bit position shifts applied by the shift circuitry.

In at least one embodiment, the shift circuitry is further configured to apply multiple different bit position shifts to the high part of the first result consistent with asserted bits in the fixed polynomial, and the bitwise exclusive OR (XOR) circuitry is further configured to logically combine multiple instances of the high part of the first result having different respective bit position shifts applied by the shift circuitry to obtain a second result. The bitwise XOR circuitry generates the reduced product based on the first result, the second result, and the low part of the product.

In at least one embodiment, the bitwise exclusive OR (XOR) circuitry includes at least two stages of bitwise XOR circuitry.

In at least one embodiment, the processor includes a conditional bit reversal circuit configured to, prior to multiplication of the operands, conditionally reverse a bit ordering of bytes in one of the operands based on a mode indicated by the Galois multiply instruction.

In at least one embodiment, the carryless multiplier is a first multiply-multiply engine, the execution unit includes a second multiply-multiply engine, the first and second multiply-multiply engines both have a first data width, and the operands include first and second operands having a second data width that is an integer multiple of the first data width.

In this case, the first and second multiply-multiply engines are configured to multiply subsets of the first and second operands in parallel.

BRIEF DESCRIPTION OF THE SEVERAL VIEWS OF THE DRAWINGS

FIG. 16 is a high-level logical flowchart of an exemplary method of Galois multiplication in accordance with one embodiment.

DETAILED DESCRIPTION

Figure 1:
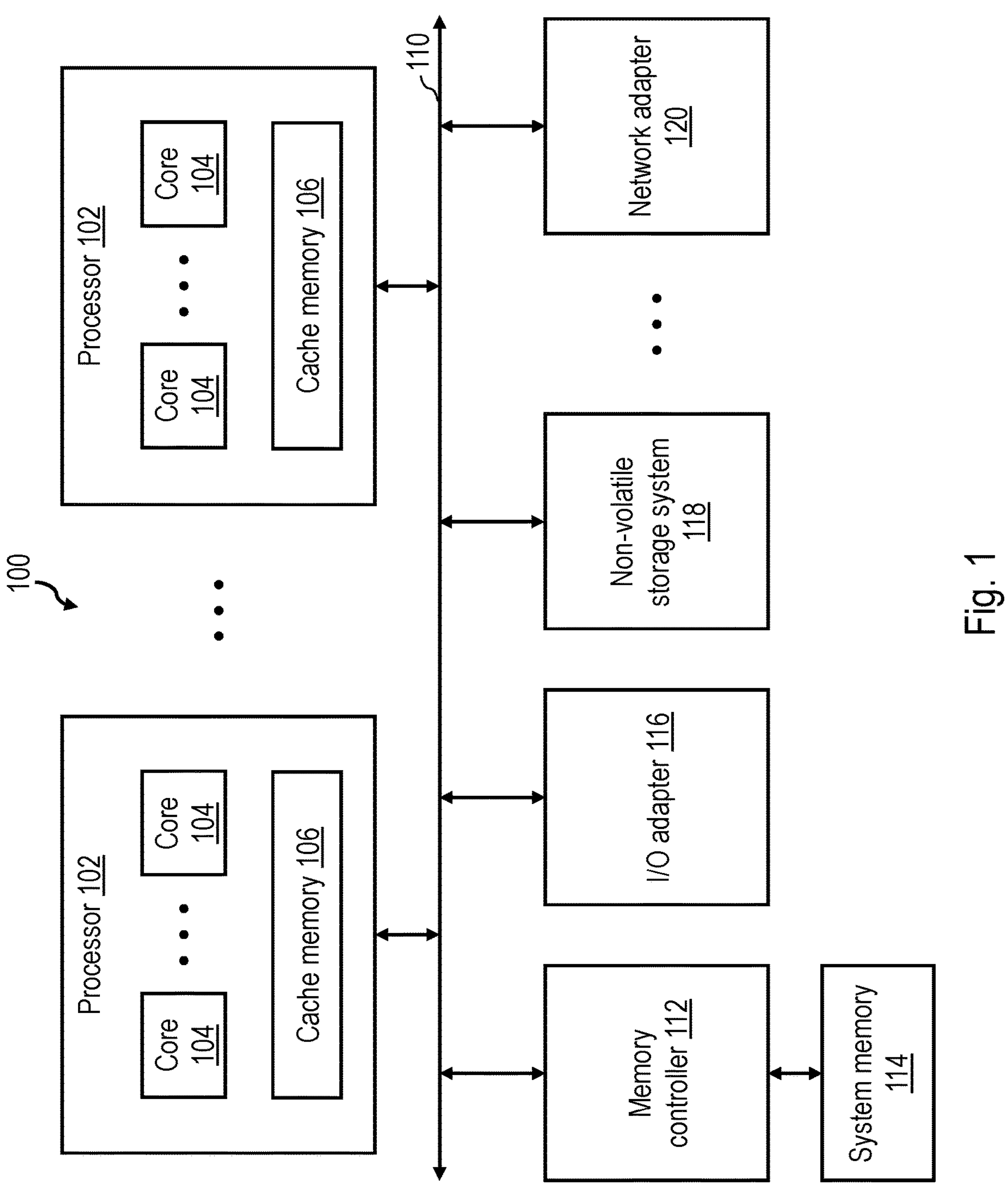
FIG. 1 is a high-level block diagram of a data processing system including a processor in accordance with one embodiment.

With reference now to the figures and in particular with reference to FIG. 1, there is illustrated a high-level block diagram of a data processing system 100 in accordance with one embodiment. In some implementations, data processing system 100 can be, for example, a server computer system (such as one of the POWER series of servers available from International Business Machines Corporation), a mainframe computer system, a mobile computing device (such as a smartphone or tablet), a laptop or desktop personal computer system, or an embedded processor system.

As shown, data processing system 100 includes one or more processors 102 that process instructions and data. Each processor 102 may be realized as a respective integrated circuit having a semiconductor substrate in which integrated circuitry is formed, as is known in the art. In at least some embodiments, processors 102 can generally implement any one of a number of commercially available processor architectures, for example, POWER, ARM, Intel x86, NVidia, Apple silicon, etc. In the depicted example, each processor 102 includes one or more processor cores 104 and cache memory 106 providing low latency access to instructions and operands likely to be read and/or written by processor cores 104. Processors 102 are coupled for communication by a system interconnect 110, which in various implementations may include one or more buses, switches, bridges, and/or hybrid interconnects.

Data processing system 100 may additionally include a number of other components coupled to system interconnect 110. These components can include, for example, a memory controller 112 that controls access by processors 102 and other components of data processing system 100 to a system memory 114. In addition, data processing system 100 may include an input/output (I/O) adapter 116 for coupling one or I/O devices to system interconnect 110, a non-volatile storage system 118, and a network adapter 120 for coupling data processing system 100 to a communication network (e.g., a wired or wireless local area network and/or the Internet).

Those skilled in the art will additionally appreciate that data processing system 100 shown in FIG. 1 can include many additional non-illustrated components. Because such additional components are not necessary for an understanding of the described embodiments, they are not illustrated in FIG. 1 or discussed further herein. It should also be understood, however, that the enhancements described herein are applicable to data processing systems and processors of diverse architectures and are in no way limited to the generalized data processing system architecture illustrated in FIG. 1.

Figure 2:
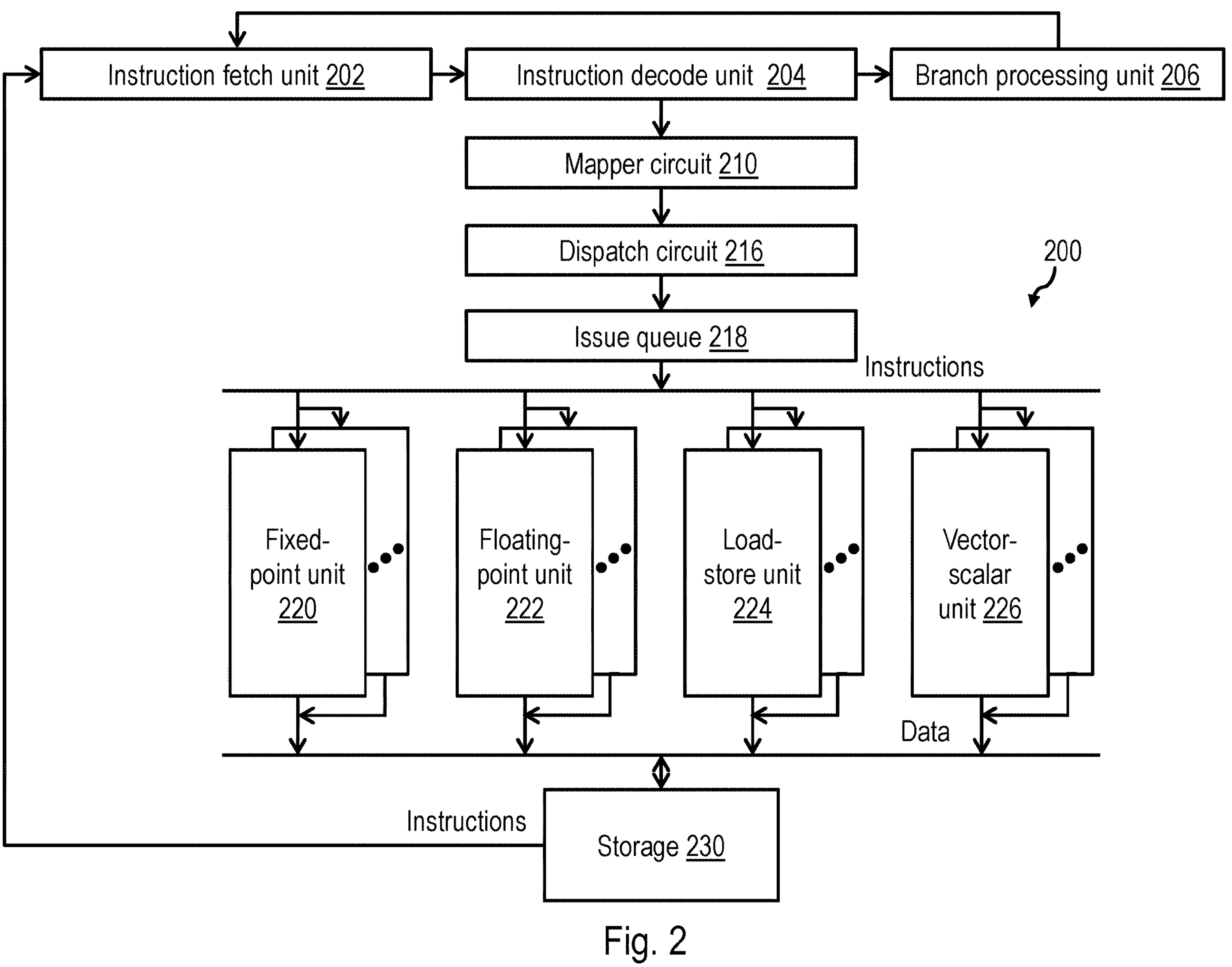
FIG. 2 is a high-level block diagram of a processor core in accordance with one embodiment.

Referring now to FIG. 2, there is depicted a high-level block diagram of an exemplary processor core 200 in accordance with one embodiment. Processor core 200 may be utilized to implement any of processor cores 104 of FIG. 1.

In the depicted example, processor core 200 includes an instruction fetch unit 202 for fetching instructions within one or more streams of instructions from storage 230 (which may include, for example, cache memories 106 and/or system memory 114 from FIG. 1). In a typical implementation, each instruction has format defined by the instruction set architecture of processor core 200 and includes at least an operation code (opcode) field specifying an operation (e.g., fixed-point or floating-point arithmetic operation, vector operation, matrix operation, logical operation, branch operation, memory access operation, cryptographic operation, etc.) to be performed by processor core 200. Certain instructions may additionally include one or more operand fields directly specifying operands or implicitly or explicitly referencing one or more registers storing source operand(s) to be utilized in the execution of the instruction and one or more registers for storing destination operand(s) generated by execution of the instruction. Instruction decode unit 204, which in some embodiments may be merged with instruction fetch unit 202, decodes the instructions retrieved from storage 230 by instruction fetch unit 202 and forwards branch instructions that control the flow of execution to branch processing unit 206. In some embodiments, the processing of branch instructions performed by branch processing unit 206 may include speculating the outcome of conditional branch instructions. The results of branch processing (both speculative and non-speculative) by branch processing unit 206 may, in turn, be utilized to redirect one or more streams of instruction fetching by instruction fetch unit 202.

Instruction decode unit 204 forwards instructions that are not branch instructions (often referred to as "sequential instructions") to mapper circuit 210. Mapper circuit 210 is responsible for the assignment of physical registers within the register files of processor core 200 to instructions as needed to support instruction execution. Mapper circuit 210 preferably implements register renaming. Thus, for at least some classes of instructions, mapper circuit 210 establishes transient mappings between a set of logical (or architected) registers referenced by the instructions and a larger set of physical registers within the register files of processor core 200. As a result, processor core 200 can avoid unnecessary serialization of instructions that are not data dependent, as might otherwise occur due to the reuse of the limited set of architected registers by instructions proximate in program order.

Still referring to FIG. 2, processor core 200 additionally includes a dispatch circuit 216 configured to ensure that any data dependencies between instructions are observed and to dispatch sequential instructions as they become ready for execution. Instructions dispatched by dispatch circuit 216 are temporarily buffered in an issue queue 218 until the execution units of processor core 200 have resources available to execute the dispatched instructions. As the appropriate execution resources become available, issue queue 218 issues instructions from issue queue 218 to the execution units of processor core 200 opportunistically and possibly out-of-order with respect to the original program order of the instructions.

In the depicted example, processor core 200 includes several different types of execution units for executing respective different classes of instructions. In this example, the execution units include one or more fixed-point units 220 for executing instructions that access fixed-point operands, one or more floating-point units 222 for executing instructions that access floating-point operands, one or more load-store units 224 for loading data from and storing data to storage 230, and one or more vector-scalar units 226 for executing instructions that access vector and/or scalar operands. In a typical embodiment, each execution unit is implemented as a multi-stage pipeline in which multiple instructions can be simultaneously processed at different stages of execution. Each execution unit preferably includes or is coupled to access at least one register file including a plurality of physical registers for temporarily buffering operands accessed in or generated by instruction execution.

Those skilled in the art will appreciate that processor core 200 may include additional unillustrated components, such as logic configured to manage the completion and retirement of instructions for which execution by execution units 220-226 is finished. Because these additional components are not necessary for an understanding of the described embodiments, they are not illustrated in FIG. 2 or discussed further herein.

Figure 3:
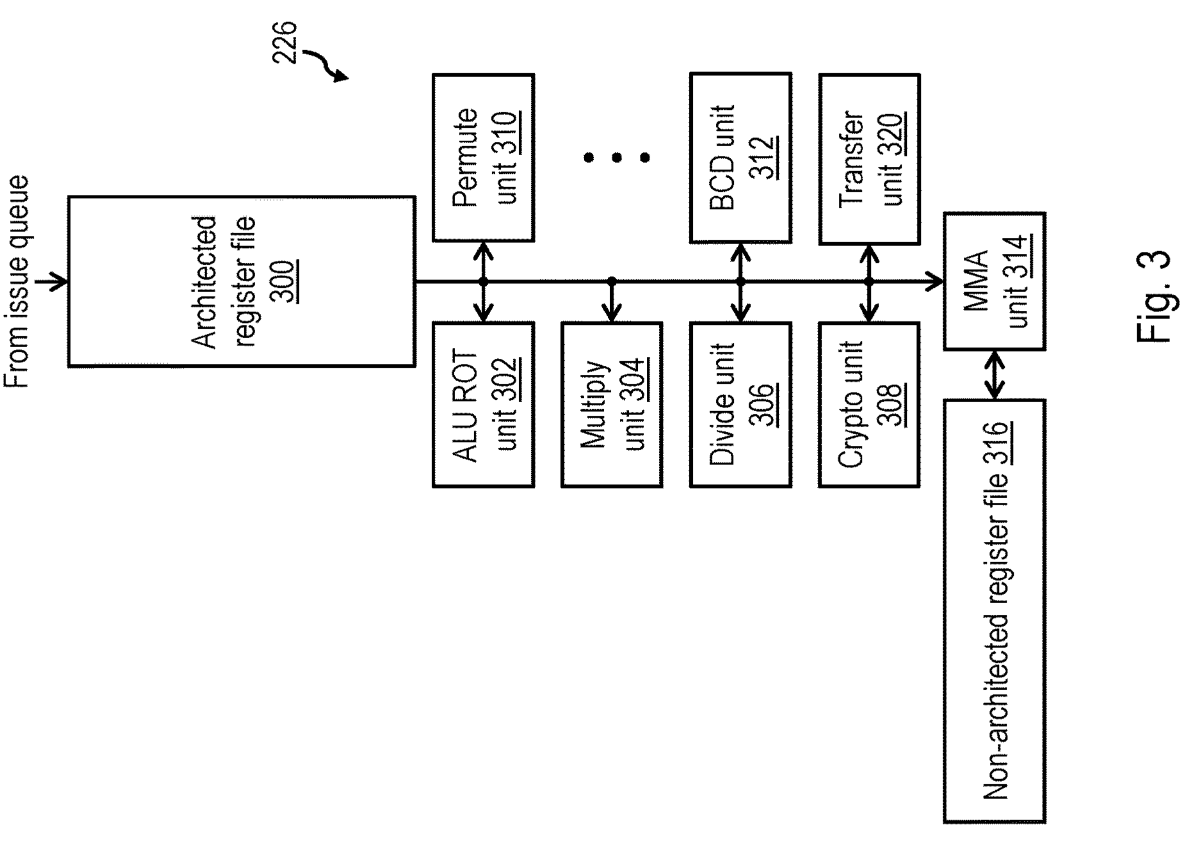
FIG. 3 is a high-level block diagram of an exemplary execution unit of a processor core in accordance with one embodiment.

With reference now to FIG. 3, there is illustrated a high-level block diagram of an exemplary execution unit of a processor 102 in accordance with one embodiment. In this example, a vector-scalar unit 226 of processor core 200 is shown in greater detail. In the embodiment of FIG. 3, vector-scalar unit 226 is configured to execute multiple different classes of instructions that operate on and generate different types of operands. For example, vector-scalar unit 226 is configured to execute a first class of instructions that operate on vector and scalar source operands and that generate vector and scalar destination operands. Vector-scalar unit 226 executes instructions in this first class of instructions in functional units 302-312, which in the depicted embodiment include an arithmetic logic unit/rotation unit 302 for performing addition, subtraction, and rotation operations, a multiply unit 304 for performing binary multiplication, a divide unit 306 for performing binary division, a cryptography unit 308 for performing cryptographic functions, a permute unit 310 for performing operand permutations, and binary-coded decimal (BCD) unit 312 for performing decimal mathematical operations. The vector and scalar source operands on which these operations are performed and the vector and scalar destination operands generated by these operations are buffered in the physical registers of an architected register file 300.

In this example, vector-scalar unit 226 is additionally configured to execute a second class of instructions that operate on matrix operands and that generate matrix operands. Vector-scalar unit 226 executes instructions in this second class of instructions in a matrix multiply-accumulate (MMA) unit 314. The matrix operands on which these operations are performed and the matrix operands generated by these operations are buffered and accumulated in the physical registers of a non-architected register file 316.

In operation, instructions are received by vector-scalar unit 226 from issue queue 218. If an instruction is in the first class of instructions (e.g., vector-scalar instructions), the relevant source operand(s) for the instruction are accessed in architected register file 300 utilizing the mapping between logical and physical registers established by mapper circuit 210 and then forwarded with the instruction to the relevant one of functional units 302-312 for execution. The destination operand(s) generated by that execution are then stored back to the physical register(s) of architected register file 300 determined by the mapping established by mapper circuit 210. If, on the other hand, the instruction is in the second class of instructions (e.g., MMA instructions), the instruction is forwarded to MMA unit 314 for execution with respect to operand(s) buffered in specified physical registers of non-architected register file 316. In this case, the execution by MMA unit 314 includes performing a matrix multiplication operation followed by accumulation (e.g., summing) of the resulting product with the contents of one or more specified physical registers in non-architected register file 316.

Figure 4:
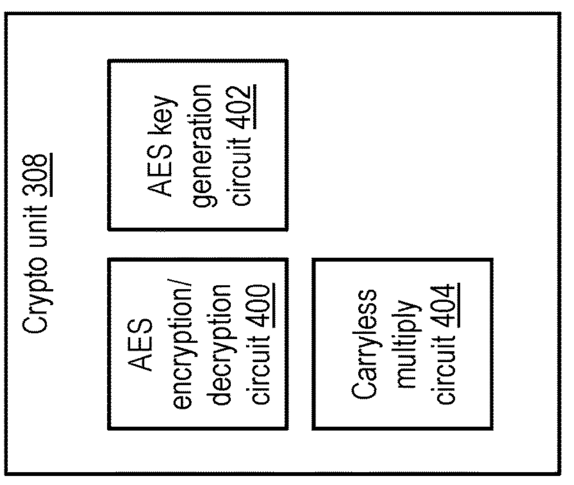
FIG. 4 is a more detailed block diagram of a cryptography unit within a processor core in accordance with one embodiment.

Referring now to FIG. 4, there is depicted a more detailed block diagram of an exemplary cryptography unit 308 in accordance with one embodiment. In this example, cryptography unit 308 includes circuitry for performing encryption and decryption according to the AES (Advanced Encryption Standard) in hardware. AES is defined, for example, in International Organization for Standardization (ISO)/International Electrotechnical Commission (IEC) Standard 18033-3, $2^{nd}$ Ed., Dec. 15, 2010, which is incorporated herein by reference. As shown, this circuitry includes an AES encryption/decryption circuit 400 that combines encryption keys with plaintext to obtain ciphertext and that combines decryption keys with ciphertext to obtain plaintext. Cryptography unit 308 additionally includes AES key generation circuit 402, which generates the keys utilized by AES encryption/decryption circuit 400 to encrypt and decrypt data. Cryptography unit 308 also includes a carry-less multiply circuit 404, as described in detail below. Carryless multiply circuit 404 can be utilized, for example, in the process of generating signatures utilized to authenticate encrypted messages in AES-GCM (Galois Counter Multiply). Carryless multiply circuit 404 can also be utilized to perform Galois multiplication in the process of encrypting and decrypting a message, for example, in AES-XTS (XEX-based tweaked-codebook mode with ciphertext stealing).

Figure 5:
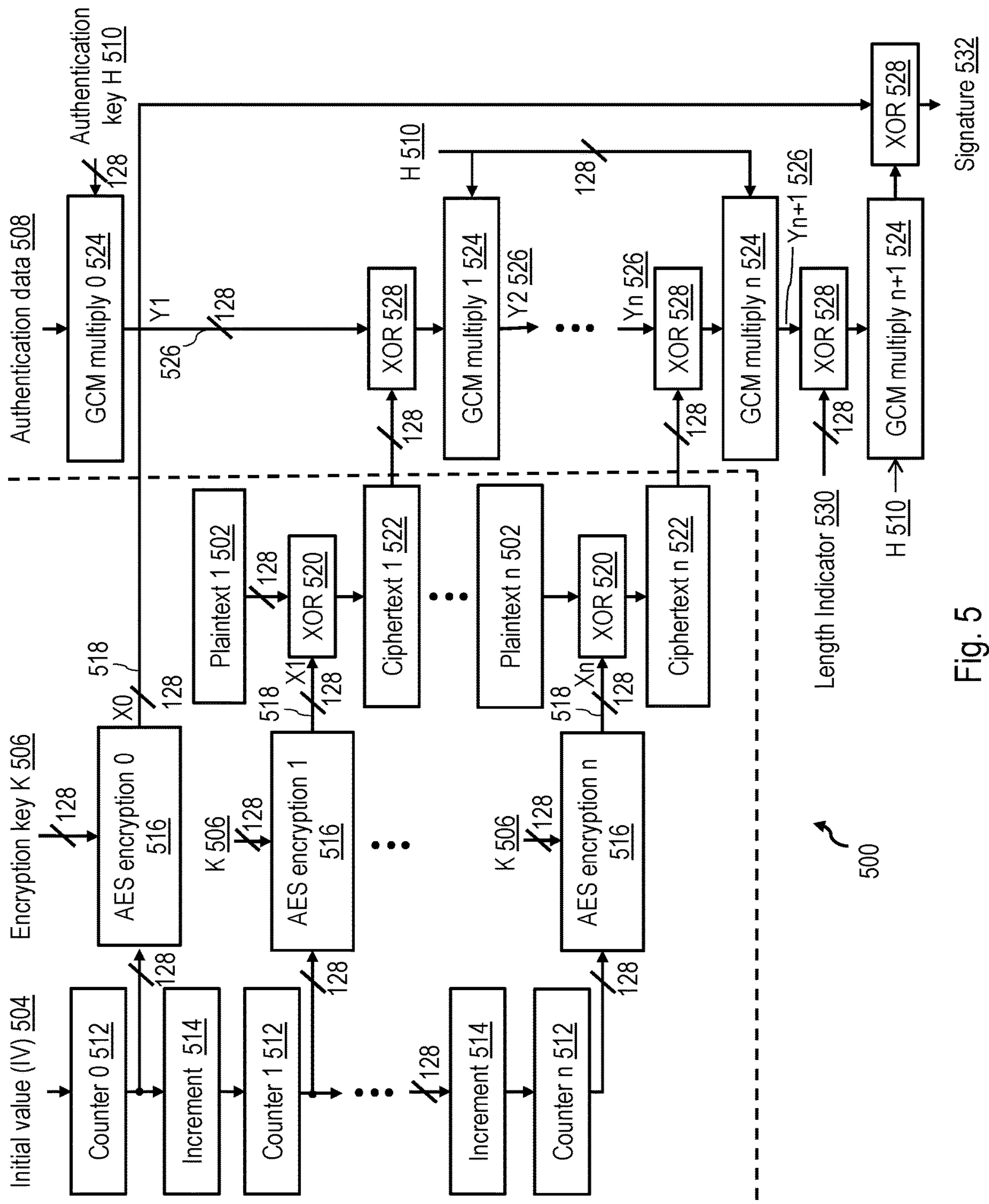
FIG. 5 is a time-space diagram of encryption and authentication process utilizing AES-GCM (Advanced Encryption Standard—Galois Counter Mode)

With reference now to FIG. 5, there is illustrated a time-space diagram of an encryption and authentication process 500 utilizing AES-GCM (Advanced Encryption Standard—Galois Counter Mode). AES-GCM is utilized to encrypt n plaintext blocks 502 (each a 128-bit input string) to obtain n 128-bit ciphertext blocks 522 and a signature 532 that can be utilized to authenticate that the n ciphertext blocks 522 are unmodified. AES-GCM is thus useful for securing data in-flight.

In addition to plaintext 502, encryption process 500 begins with an initial value 504 (e.g., a random value extended to 128 bits), an encryption key K 506 (here assumed to be a 128-bit value), authentication data 508 (here assumed to be a single 128-bit block), a 128-bit authentication key H 510, and a positive integer n determined by the number of 128-bit blocks in the plaintext (and ciphertext). Initial value 504 is a 128-bit value utilized to initialize the value of counter 0 512. The value of counter 0 512 is iteratively incremented by an increment function 514 n times to generate a sequence of 128-bit counter values identified in FIG. 5 as counter 1 512 to counter n 512. Each of these n+1 counter values and encryption key K 506 are processed in one of n+1 instantiations of an AES encryption function 516 to produce a respective one of n+1 128-bit encryption outputs X0 to Xn 518.

As further shown in FIG. 5, plaintext 1 502 is logically combined by exclusive OR (XOR) function 520 with encryption output X1 518 to generate ciphertext 1 522. Plaintext 2 502 is similarly logically combined by a XOR function 520 with encryption output X2 to generate a ciphertext 2. This process continues for n iterations until final ciphertext n 522 is obtained.

Authentication data 508 and authentication key H 510 form two inputs of a Galois counter multiply (GCM) 0 function 524, which produces a 128-bit authentication value Y1 526. This authentication value Y1 526 is logically combined by an XOR function 528 with ciphertext 1 522 to produce an input of a next GCM multiply 1 function 524. GCM multiply 1 function 524 multiplies this input by authentication key H 510. This process continues iteratively for n rounds of multiplication until authentication value Yn+1 526 is obtained. Authentication value Yn+1 is logically combined by an XOR function 528 with a 128-bit length indicator 530, which is formed by the concatenation of the length of authentication data 508 and the length of the ciphertext 522. The output of this XOR function 528 provides a first input of GCM multiply n+1 function 524, which multiplies this input by authentication key H 510. The 128-bit product produced by GCM multiply n+1 function 524 is then logically combined by a XOR function 528 with encryption output X0 518 to obtain the signature 532 that can be utilized to authenticate the n-block ciphertext.

As noted above, performance concerns make it desirable to provide direct support for encryption algorithms such as the AES-GCM function depicted in FIG. 5 in processor hardware. One complication with implementing hardware support for encryption algorithms is the use of differing endianness of bits and bytes between various processor hardware and various encryption algorithms. For example, Table I below summarizes the endianness of bits and bytes for three common encryption functions, namely, AES, GCM, and XTS. As shown, under AES, the leading (left-most) bit in each byte is the most significant bit, and the leading (left-most) byte in each data word is the most significant byte. This combination of bit and byte ordering can be referred to as Big-Big Endian (BBE). GCM, on the other hand, specifies that the leading bit of each byte and the leading byte of each data word is least significant. This endianness is referred to as Little-Little Endian (LLE). XTS employs a yet third endianness, referred to as Big-Little Endian (BLE), in which the leading bit of each byte is the most significant bit, but the leading byte of a data word is the least significant byte.

TABLE I

| Endianness | Bits | Bytes | |
|---|---|---|---|
| AES | Big | big | BBE |
| GCM | Little | little | LLE |
| XTS | Big | little | BLE |

In general, each physical processor implements a native one of these three endianness options, with BBE and BLE hardware being the most common commercially. Regardless of which native endianness is implemented by hardware, some data reformatting to compensate for differences in endianness is required to provide hardware support for encryption algorithms having diverse endianness (e.g., AES, GCM, and XTS). In general, that data reformatting can be implemented, for example, when passing data from the AES-Counter encryption portion of process 500 (shown to the left of the dashed line) to the authentication portion of the process (shown to the right of the dashed line), directly before and after each GCM function 524, or as part of the GCM function 524 itself.

In cryptographic software libraries, encryption and authentication are often implemented as separate functions. In such software implementations, encryption output X0 518 and ciphertext 1 to ciphertext n are passed through memory, and these data are reformatted automatically as part of the memory read and memory write accesses. However, for hardware implementations of cryptographic functions, data reformatting must be applied to register file data to obtain acceptable performance. In the following description, embodiments of a processor having native BBE endianness and hardware support for the Galois multiplication employed in AES-GCM and AES-XTS are described in detail. The processor accepts data in the machine native endianness (e.g., BBE) and performs the Galois multiplication for LLE or BLE format. From the following description, those skilled in the art will appreciate that the disclosed techniques can also be applied to processors having a native BLE endianness through the implementation of circuitry to reverse the ordering of bits in byte for GCM encryption.

Galois multiplication, for example, as employed in GCM multiply function 524 of FIG. 5, involves a carryless multiply followed by a modular reduction. For example, in one embodiment, a carryless multiplication of two 128-bit input operands A and B produces a 255-bit product P. Modular reduction modulo polynomial g(x) reduces P to a 128-bit number through an iterative process.

For ease of understanding, reduction for natural numbers modulo G is first explained and then applied to the modular reduction of Galois Field (GF)(2^128) modulo g(x). In the following reduction, variables G and J are first defined as follows:

$$G=2^{128}+(2^7+2^2+2^1+1)=2^{128}+J, \text{ where}$$

$$J=2^7+2^2+2^1+1$$

Given these definitions of G and J, a first step of modular reduction partitions an arbitrary 255-bit number P into a 128-bit low part PL and a 127-bit high part PH, where PL<G. This partitioning results in the relation:

$$P=PH*2^{\wedge}128+PL$$

In a second step of reduction, P is reduced to a number T having at most 135 bits according to the following set of relations:

$$P=PL+PH*(2^{\wedge}128+(J-J))=PL+PH*(G-J)==PL+PH*(-J)=T$$

where "==" means equivalent modular G (rather than equal). In a third step of reduction, T is again partitioned into a 7-bit high part (TH) and a 128-bit low part (TL) as given by:

$$T=TL+TH*2^{\wedge}128$$

Finally, in a fourth step of reduction, T is reduced to T' in the same matter as in step 2 to obtain a result that is less than G via the relation:

$$T'=TL+TH*(-J)$$

Figure 6:
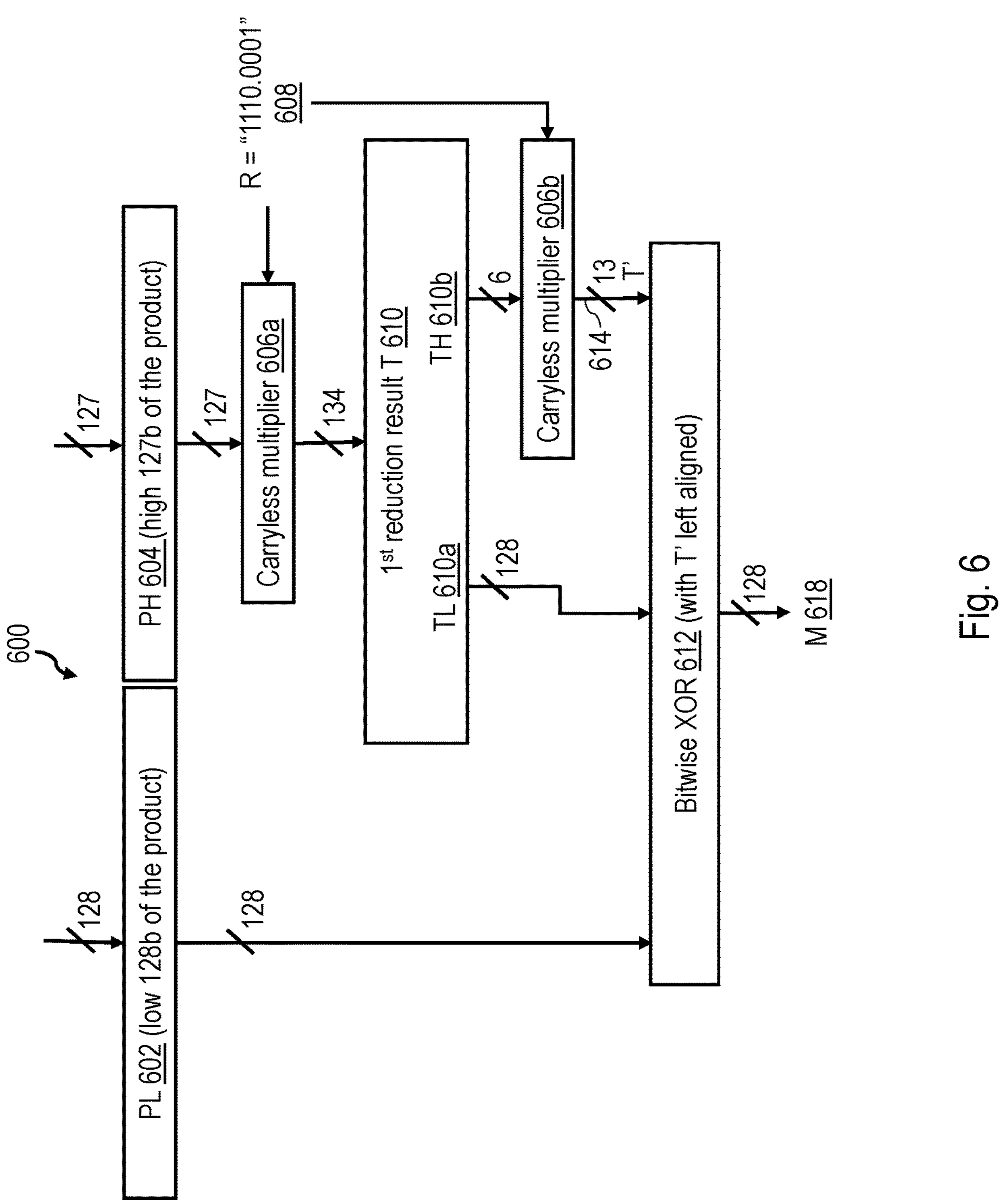
FIG. 6 is a block diagram of a modular reduction circuit for performing modular reduction in the Galois Field in accordance with one embodiment.

Given this understanding of the process of modular reduction, reference is now made to FIG. 6, which is a block diagram of a modular reduction circuit 600 for performing modular reduction in the Galois Field with polynomial g(x) in accordance with one embodiment.

In the Galois Field, multiplication is a carryless operation, and addition and subtraction are performed utilizing bitwise XOR. The carryless multiplication of two w-bit numbers produces a (2w−1)-bit product. Thus, for example, multiplication of two 128-bit numbers yields a product P having 255 bits. As described above, in a first step of reduction, product P is partitioned into a 128-bit low-order part PL 602 and a 127-bit high-order part PH 604. PH 604 forms an input of carryless multiplier 606*a*, which multiplies PH 604 by the equivalent of (−J). For a GF(2^128) with LLE format, this multiplier is R='1110.0001'. The carryless multiply of PH 604 and R 608 produces a 134-bit product T 610, which is partitioned into a 128-bit low-order part TL 610*a* and a 6-bit high-order part TH 610*b*. A second carryless multiplier 606*b* multiplies TH 610*b* by R 608, producing a 13-bit product T' 614. Bitwise XOR circuit 612 performs a left-aligned bitwise exclusive OR of PL 602, TL 610*a*, and T' 614 to produce a fully reduced 128-bit product M 618. In various embodiments, carryless multipliers 606*a* and 606*b* can be implemented with full size 128×128 bit LLE multipliers or with a 127×8 bit multiplier and a 6×8 bit multiplier, respectively. When applying a different 8-bit values of R, modular reduction circuit 600 of FIG. 6 can also be used for other Galois Fields (2^k) with f(x), as along as k is less or equal to 128 and f(x) is of the form f(x)=x^k+a7*x^7+a6*x^6 . . . +a1*x^1+a0, where all a(i) are in the set {0, 1, −1}.

Figure 7:
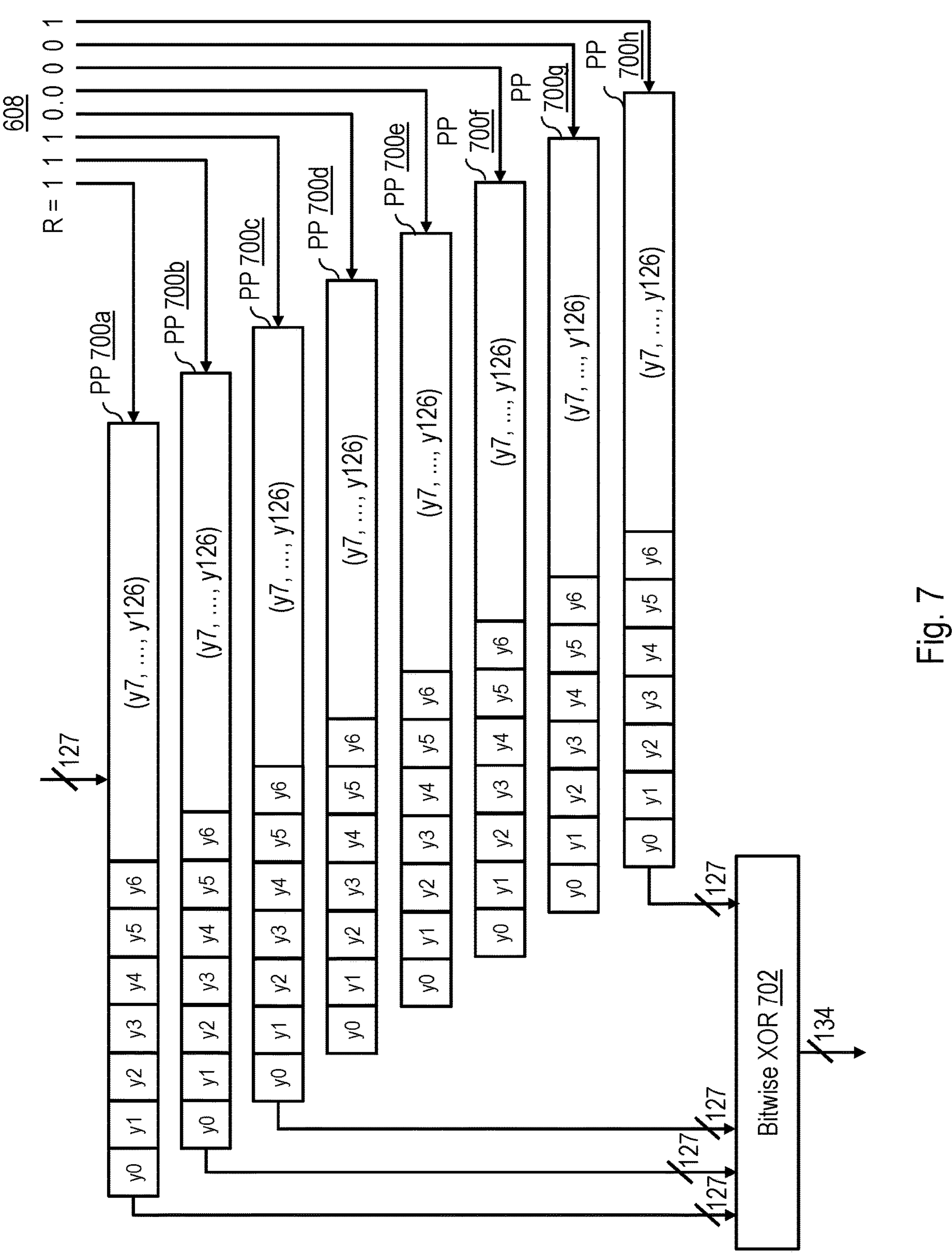
FIG. 7 illustrates an optimization of carryless multiplication in accordance with one embodiment.

With reference now to FIG. 7, there is illustrated a further optimization of carryless multiplication in accordance with one embodiment. As shown, the carryless multiplication of 127-bit PH 604 by 8-bit constant R 608 would result in eight partial products PP 700*a*-700*h*. However, because R 608 is a constant with just four ones (i.e., '1110.0001'), the carryless multiplication of PH 604 by R 608 can drop the four partial products PP 700*d*-700*g* multiplied by zeros. As a result, the product can be obtained from the remaining partial products PP 700*a*-PP 700*c* and PP 700*h* utilizing a four-input bitwise XOR circuit 702 that performs the following exclusive OR operation:

PL*R=PL XOR(PL>>1) XOR(PL>>2) XOR(PL>>7), where ">>" indicates a rightward shift the indicated number of bit positions This optimization can reduce the hardware cost of implementing carryless multiplier 606*a* of FIG. 6 by over a factor of two.

Figure 8:
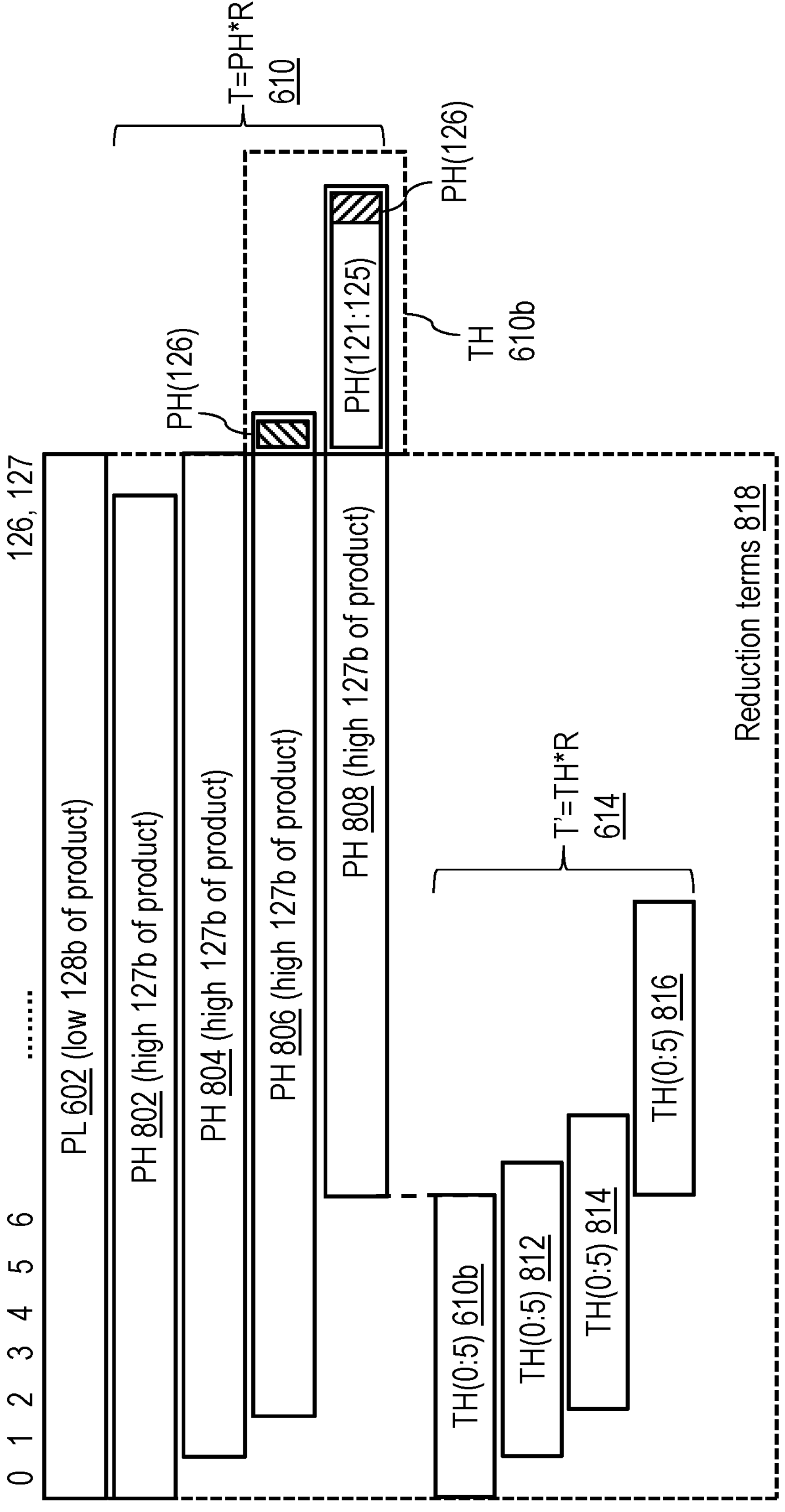
FIG. 8 depicts the application of the technique of carryless multiplication of FIG. 7 to the circuit of FIG. 6.

FIG. 8 depicts the application of the technique of carryless multiplication shown in FIG. 7 to modular reduction circuit 600 of FIG. 6. In particular, FIG. 8 illustrates that the multiplication of PH*R by carryless multiplier 606*a* results in four reduction terms: PH 802, PH shifted right by 1 bit position 804, PH shifted right by 2 bit positions 806, and PH shifted right by 7 bit positions 808. The most significant bit of PH 806 and the most significant 6 bits of PH 808 are combined to form TH 610*b*, the high-order part of the first reduction result. More precisely, TH(0)=PH(126) XOR PH(121) and

TH(1:5)=PH(122:126)

The second reduction term T'=TH*R 614 can similarly be expanded into four terms, namely, TH 610*b*, TH shifted 1 bit position to the right 812, TH shifted by 2 bit positions to the right 814, and TH shifted by 7 bit positions to the right 816. These four reduction terms, the four reduction terms of reduction result T 610, and PL 602 form the set of all reduction terms 818 that are logically combined by bitwise XOR circuit 612 according to the values of each of the 128 bit positions to produce fully reduced product M 618. Details of an embodiment of a modular reduction circuit implementing the technique of carryless multiplication given in FIG. 8 are described below with reference to FIG. 12.

Figure 9:
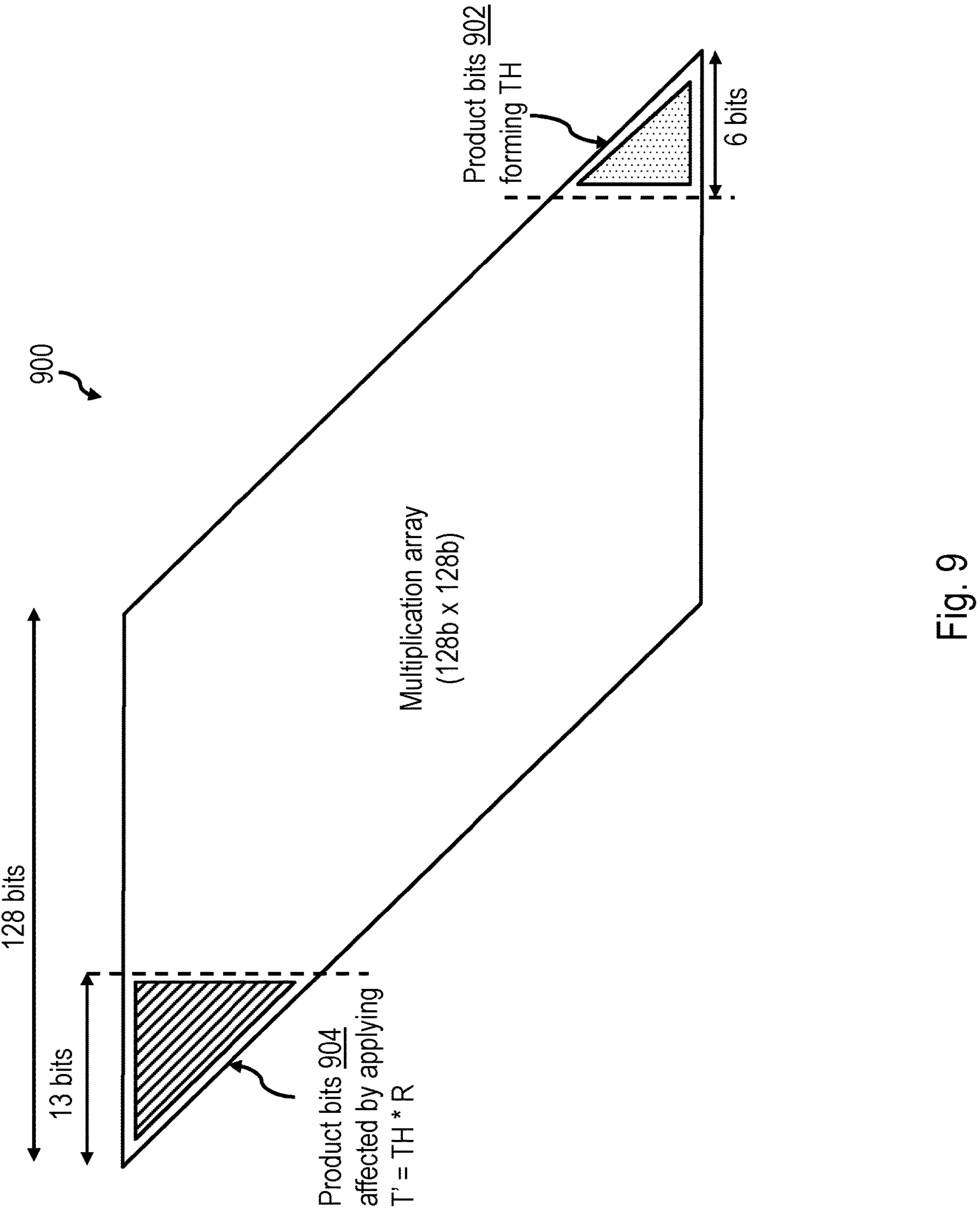
FIG. 9 is a schematic diagram of an exemplary multiplication array illustrating the locations of a first set of bits of the carryless product that are subject to one stage of modular reduction and a second set of bits of the carryless product that are subject to two stages of modular reduction.

With reference now to FIG. 9, there is illustrated a schematic representation of an exemplary 128-bit by 128-bit multiplication array 900 showing the location of the high-order product bits and low-order product bits involved in the carryless multiplication technique of FIG. 8. As shown, the high-order product bits 902 that form TH 610*b* and the low-order product bits 904 that are combined with TH 610*b* to form T' 614 are located at the extreme ends of multiplication array 900 where the depth of gates is shallowest. Consequently, the computation of product bits 902 and the logical combination of product bits 902 with product bits 904 are not the limiting factors in the performance of the carryless multiplication performed by a modular reduction circuit 600.

Figure 10:
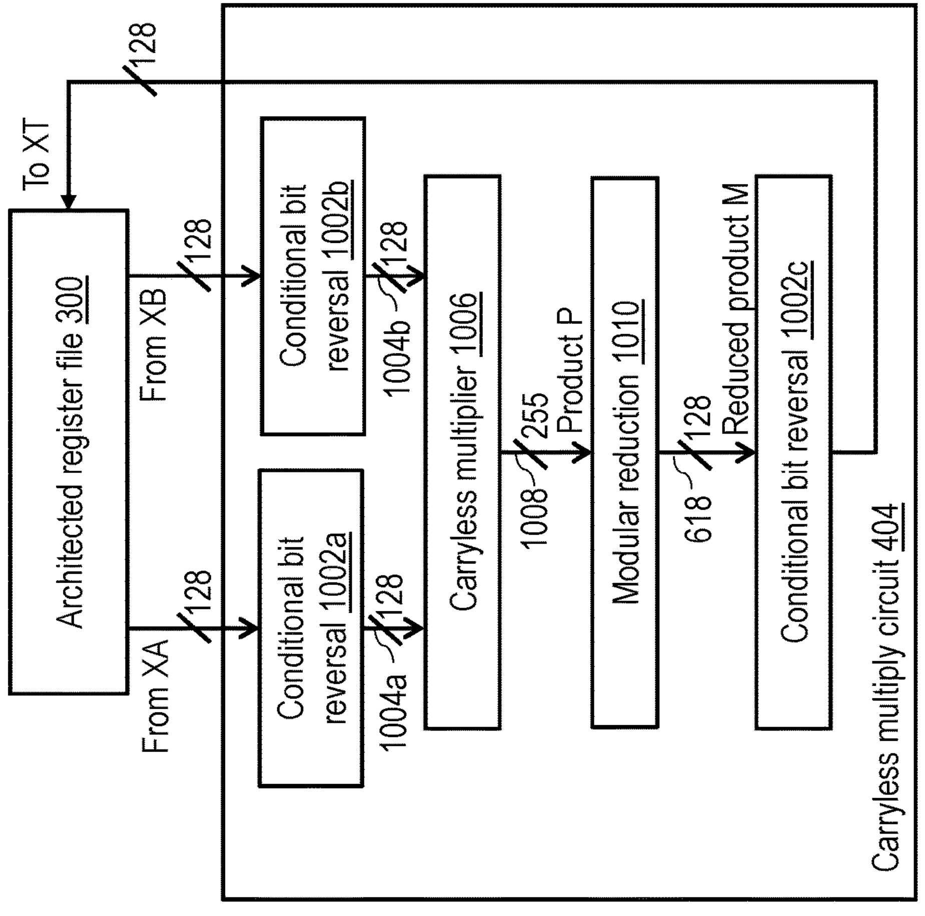
FIG. 10 is a high-level block diagram of a carryless multiply circuit in accordance with one embodiment.

Referring now to FIG. 10, there is depicted a high-level block diagram of a carryless multiply circuit 404 in accordance with one embodiment. Carryless multiply circuit 404, which implements Galois multiplication, supports both GCM and XTS and is connected to an architected register file 300 that holds operand data in native BBE format. As noted above, GCM and XTS interpret data in LLE format and BLE format, respectively.

In the depicted embodiment, carryless multiply circuit 404 includes two conditional bit reversal circuits 1102*a*, 1102*b* at its input ports and an additional conditional bit reversal circuit 1102*c* at its output port. Conditional bit reversal circuits 1102*a*, 1102*b* are each coupled to receive a respective one of two 128-bit operands A and B from registers XA and XB in architected register file 300 and to conditionally reverse the ordering of bits within bytes of operands A and B based, for example, on a mode input indicating whether carryless multiply circuit 404 is being utilized to perform a multiplication for GCM or XTS. Conditional bit reversal circuits 1002*a*, 1002*b* output a 128-bit multiplicand 1004*a* and a 128-bit multiplier 1004*b*, respectively.

Carryless multiply circuit 404 includes a carryless multiplier 1006 that performs a 128-bit by 128-bit multiplication of multiplicand 1004*a* by multiplier 1004*b*, resulting in a 255-bit product P 1008. Product P 1008 is received by and reduced to a 128-bit reduced product M 618 by a modular reduction circuit 1010, an embodiment of which is illustrated in greater detail in FIG. 12. This reduced product M 618 is then stored back to register XT of architected register file 300 after possible bit ordering reversal by conditional bit reversal circuit 1002*c*.

In the illustrated embodiment, data operands in architected register file 300 and carryless multiplier 1006 implement a BBE data format. A LLE carryless multiplication as required by GCM can be executed in a BBE-formatted carryless multiplier 1006 simply by performing a BBE-formatted multiplication followed by a leftward shift of product P 1008 by one bit position. Because the product P 1008 directly flows into modular reduction circuit 1010, the 1-bit leftward shift can conveniently be implemented by modular reduction circuit 1010.

For XTS, on the other hand, operands A and B are reformatted by conditional bit reversal circuits 1002*a*, 1002*b* to match the LLE data format of GCM. (As noted above in Table I, GCM and LLE share the same byte ordering, but have different bit orderings.) Conditional bit reversal circuit 1002*c* similarly reverses the bit ordering of the reduced product M 1012 of an XTS multiplication prior to writing reduced product M 1012 to register XT in architected register file 300.

Figure 11:
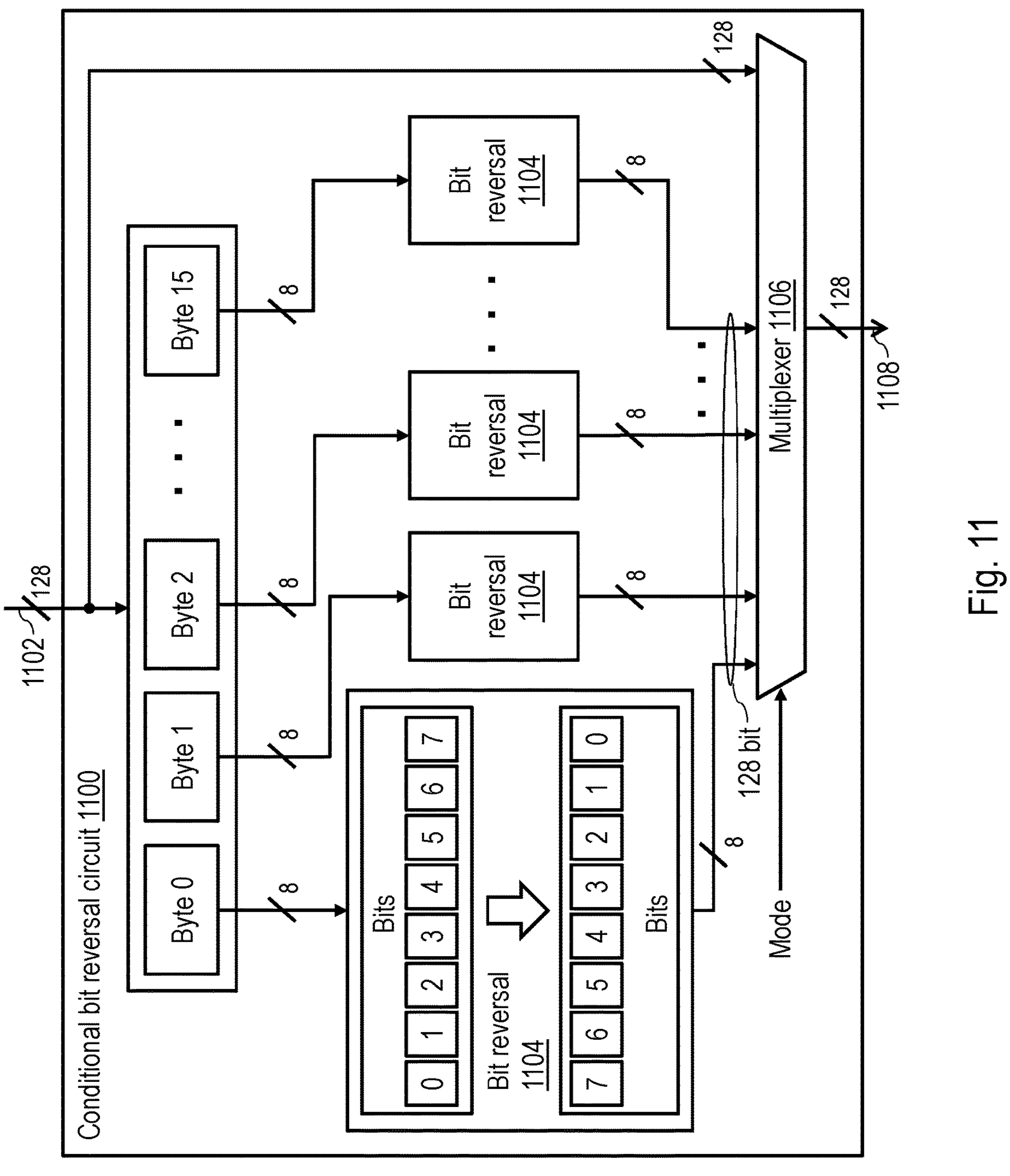
FIG. 11 is a more detailed block diagram of an exemplary embodiment of the conditional bit reversal circuit of FIG. 10.

Referring now to FIG. 11, there is depicted a more detailed block diagram of an exemplary embodiment of a conditional bit reversal circuit 1100 that can be utilized to implement any of conditional bit reversal circuits 1002*a*-1002*c* of FIG. 10. In this example, conditional bit reversal circuit 1100 has a 128-bit (i.e., 16 byte) input 1102 that is coupled to one input of a two-input 128-bit multiplexer 1106. Each of the sixteen bytes of 128-bit input 1102 is additionally coupled to a respective one of sixteen bit reversal circuits 1104, which may be implemented, for example, with wiring that reverses the ordering of bits in the relevant byte of input 1102. The outputs of all of bit reversal circuits 1104 together form a second 128-bit input of multiplexer 1106.

Multiplexer 1106 selects between the data presented at its two inputs based on a mode input indicating whether big or little Endian bit ordering is to be applied. The mode input can be determined, for example, by a corresponding field of a Galois multiply instruction, as described in greater detail below with reference to FIG. 13. The data selected by multiplexer 1106 is presented on 128-bit output 1108.

Figure 12:
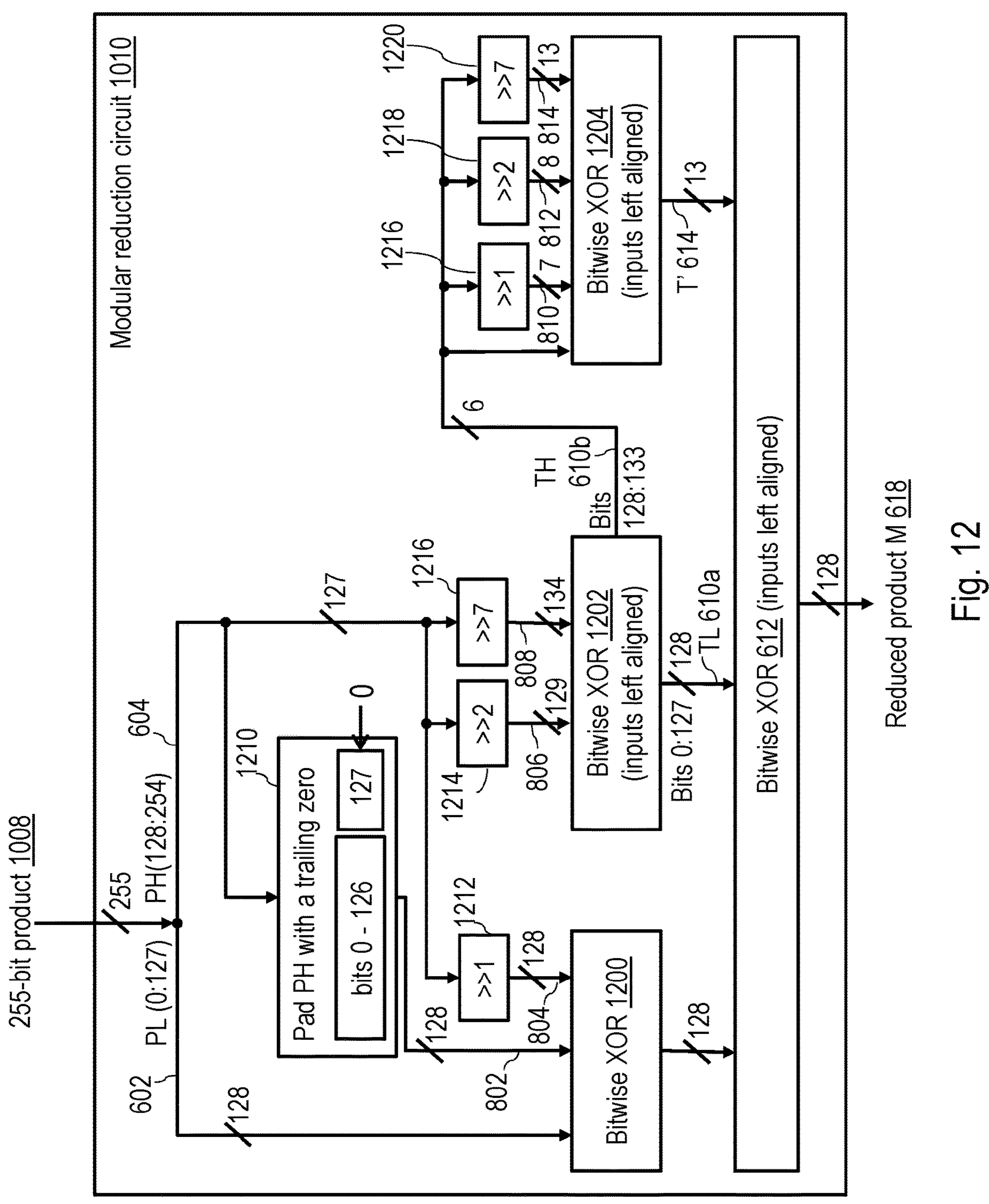
FIG. 12 is a more detailed block diagram of an exemplary embodiment of the modular reduction circuit of FIG. 10.

With reference now to FIG. 12, there is illustrated a more detailed block diagram of an exemplary embodiment of the modular reduction circuit 1010 of FIG. 10. This exemplary circuit compactly implements the two-stage reduction described with respect to FIG. 6 utilizing the optimization discussed with reference to FIG. 8.

Modular reduction circuit 1010 receives as an input the 255-bit product P 1008 generated by carryless multiplier 1006, as shown in FIG. 10. As discussed above with reference to FIG. 6, product P 1008 includes a 128-bit low part PL 602 and a 127-bit high part PH 604.

Following preliminary bit shifting and padding, modular reduction circuit 1010 reduces product P 1008 to reduced product M 618 utilizing four bitwise XOR circuits 1200, 1202, 1204, and 612 that operate on left-aligned inputs.

Bitwise XOR circuit 1200 includes three 128-bit inputs that are coupled to receive the first through third reduction terms 818 from FIG. 8, namely, PL 602, PH 802 (which is PH 604 as padded by padding circuit 1210 with a trailing zero in bit position 127), and PH 804 (which is PH 604 as shifted one bit position to the right by shift circuit 1212). The bitwise exclusive OR of these three inputs product a first 128-bit input of bitwise XOR circuit 612.

Bitwise XOR circuit 1202 similarly logically combines the fourth and fifth reduction terms 818, namely, PH 806 (which is PH 604 as shifted two bit position to the right by shift circuit 1214) and PH 808 (which is PH 604 as shifted seven bit position to the right by shift circuit 1216). The exclusive OR of these two inputs generates a 134-bit result. Bits 0:127 of this XOR result form TL 610*a*, which is a second 128-bit input of bitwise XOR circuit 612. Bits 128:133 of the XOR result generated by bitwise XOR circuit 1202 form TH 610*b*, which is passed to bitwise XOR circuit 1204 and shift circuits 1216, 1218, and 1220.

Bitwise XOR circuit 1204 logically combines the sixth through ninth reduction terms 818 forming second reduction result T' 614. That is, bitwise XOR 1204 logically combines TH 610*b*, TH 810 (which is TH 610*b* as shifted one bit position to the right by shift circuit 1216), TH 812 (which is TH 610*b* as shifted one bit position to the right by shift circuit 1218), and TH 814 (which is TH 610*b* as shifted one bit position to the right by shift circuit 1220). The bitwise exclusive OR of these four inputs, which is 13-bit second reduction result 614', forms a third input of bitwise XOR circuit 612. Bitwise XOR circuit 612 performs a left-aligned bitwise exclusive OR on its three inputs to produce reduced product M 618.

Figures 13, 14:
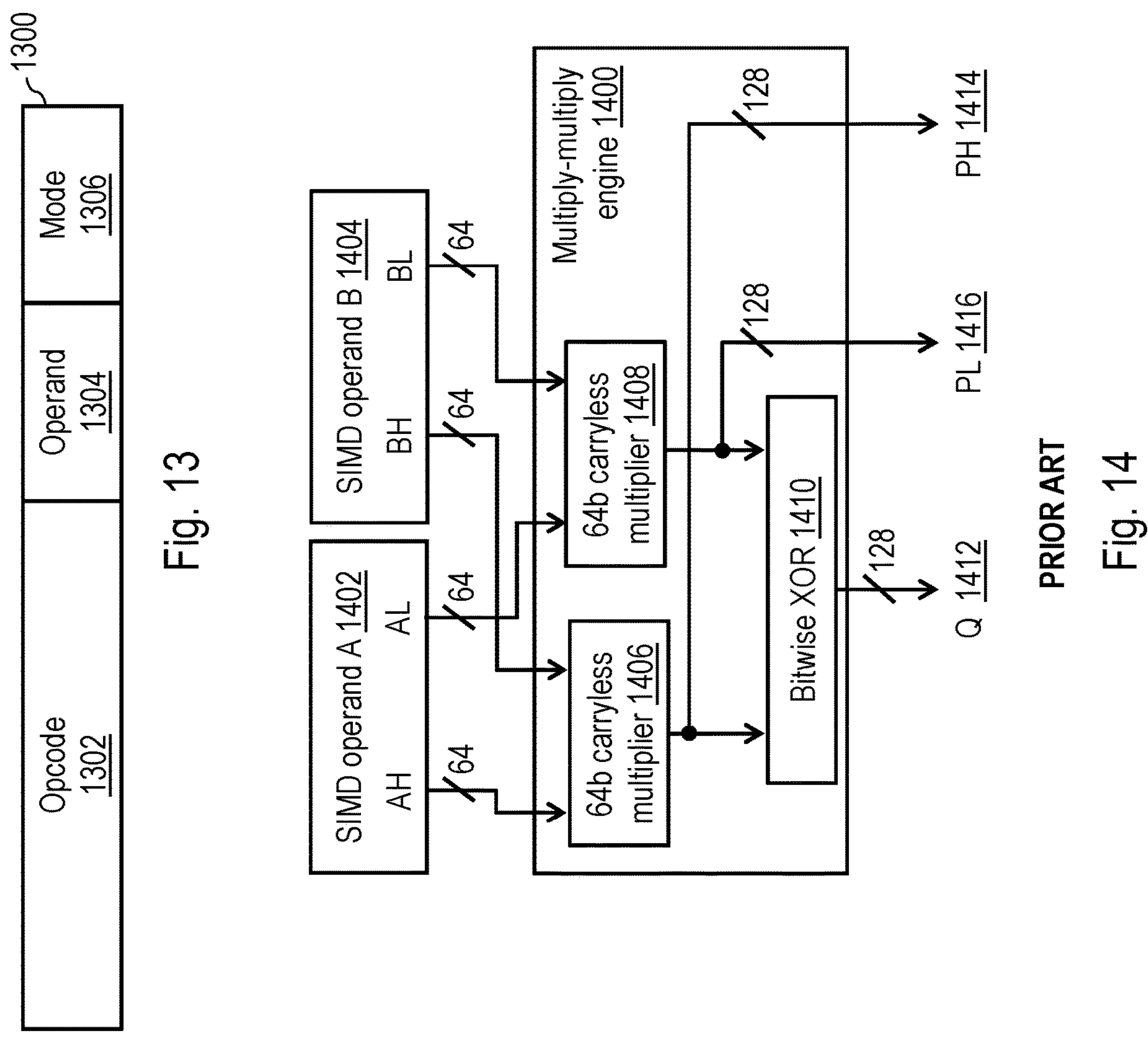
FIG. 13 depicts an exemplary Galois multiply instruction in accordance with one embodiment.
FIG. 14 illustrates a prior art single instruction multiple data (SIMD) carryless multiplication circuit.

With reference now to FIG. 13, there is illustrated an exemplary Galois multiply instruction 1300 in accordance with one embodiment. In a preferred embodiment, a single Galois multiply instruction 1300 can be executed in cryptography unit 308 of vector-scalar unit 226 to cause carryless multiply circuit 404 of FIG. 10 to perform a carryless multiply with modular reduction over polynomial g(x) as described with reference to FIG. 12.

In this example, Galois multiply instruction 1300 includes an opcode field 1302 that specifies an architecture-specific operation code indicative of a Galois carryless multiplication with modular reduction. Galois multiply instruction 1300 additionally includes an operand field 1304, which indicates, either directly or indirectly, one or more registers XA, XB, XT of architected register file 300 utilized to store source and destination operands of the Galois carryless multiplication and modular reduction operation. Finally, Galois multiply instruction 1300 includes a mode field 1306 that specifies the data format (e.g., BLE/XTS or LLE/GCM) applicable to the Galois carryless multiplication and modular reduction operation. As noted above, the setting of mode field 1306 can be utilized by condition bit reversal circuit 1100 to select whether to apply bit ordering reversal to bytes of an input data word.

The foregoing description has described aspects of the disclosed inventions with reference to a carryless multiply circuit 404 that has a wide (e.g., 128-bit by 128-bit in present technology) carryless multiplier 1006. However, some commercial processors may not include a wide carryless multiplier, but instead include multiple narrower carryless multipliers that operate in parallel on smaller data elements. For example, FIG. 14 illustrates a prior art single instruction multiple data (SIMD) multiply-multiply engine 1400 including two 64-bit carryless multipliers 1406, 1408 that operate in tandem on 128-bit SIMD operands A 1402 and B 1404. In this example, a SIMD multiply-multiply instruction causes carryless multiplier 1406 to multiply the 64-bit high parts of SIMD operands 1402, 1404 to generate a 128-bit high part PH 1414 of the product, causes carryless multiplier 1408 to multiply the 64-bit low parts of SIMD operands 1402, 1404 to generate a 128-bit low part PL 1416 of the product, and causes bitwise XOR circuit 1410 to perform a 128-bit bitwise exclusive OR of PH 1414 and PL 1416 to produce product Q 1412. Of course, this conventional SIMD architecture can be expanded to add additional lanes to support larger data widths (e.g., 256-bit operands).

Figure 15:
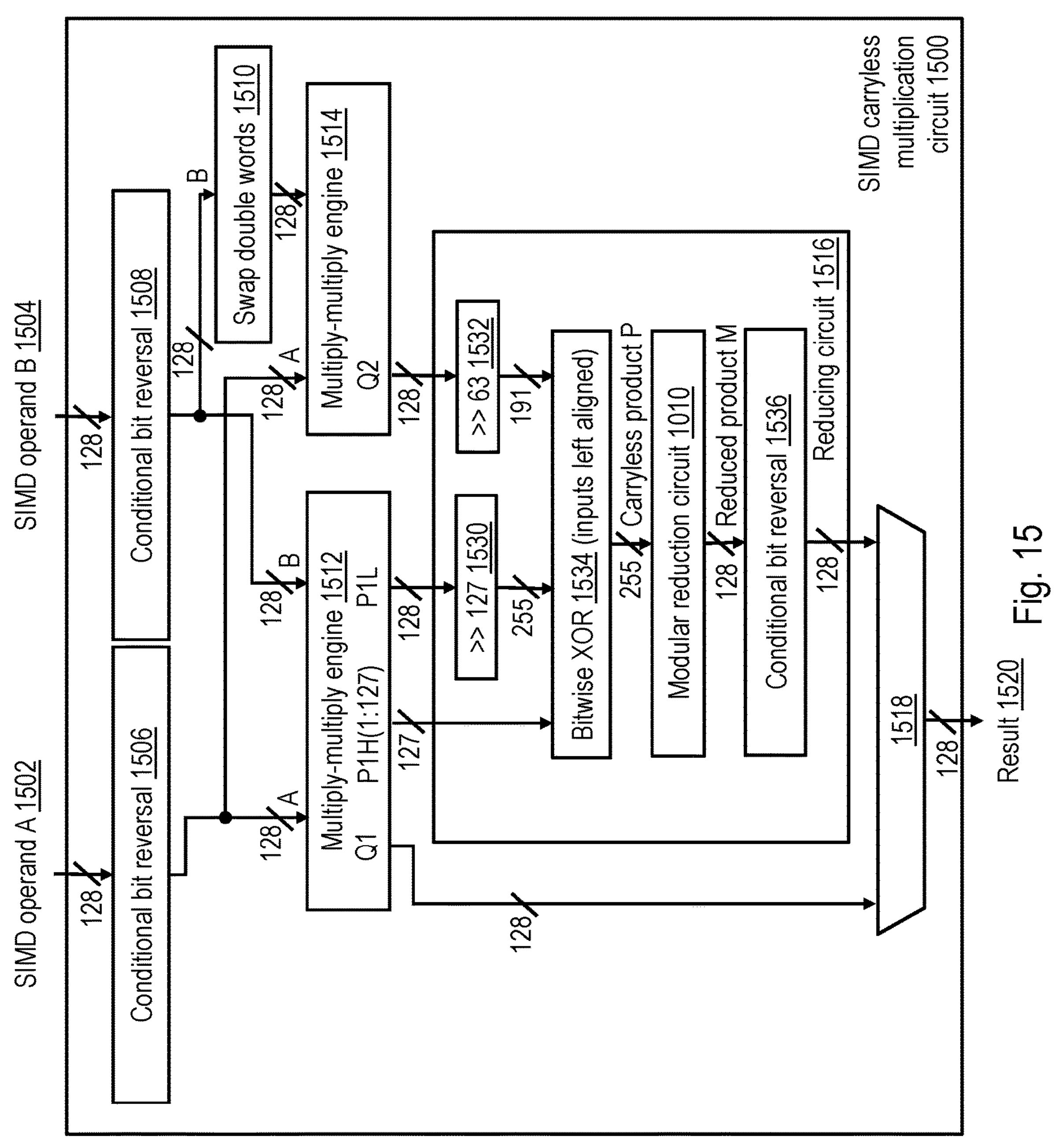
FIG. 15 depicts an exemplary SIMD carryless multiplication circuit supporting Galois multiplication in accordance with one embodiment.
Figure 18:
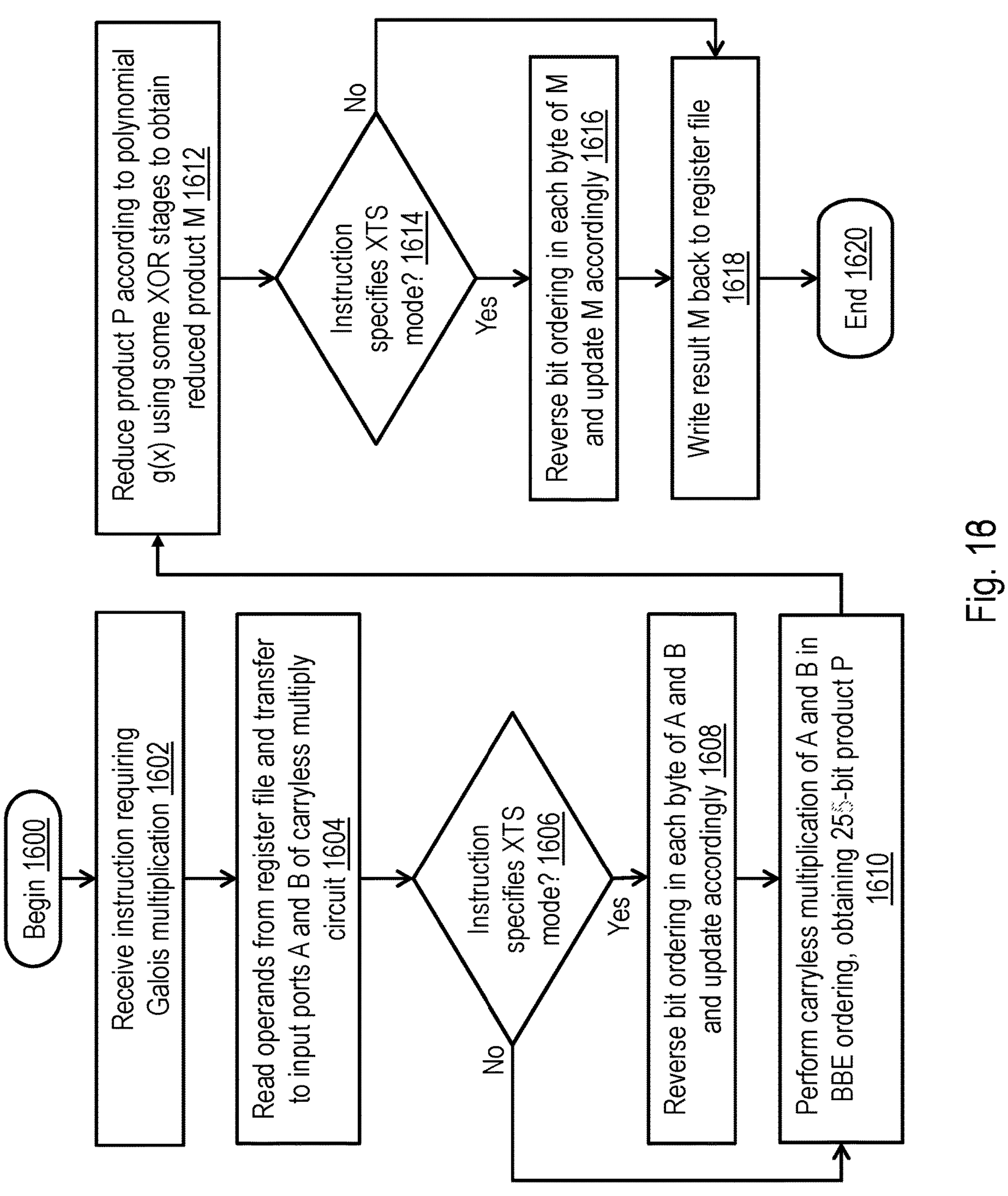

In accordance with one or more embodiments, the conventional SIMD architecture given in FIG. 14 can also be extended to support Galois multiplication as described above. For example, FIG. 15 depicts an exemplary SIMD carryless multiplication circuit 1500 supporting Galois multiplication as described herein.

SIMD carryless multiplication circuit 1500 includes conditional bit reversal circuits 1506 and 1508, which conditionally reverse the ordering of the bits in each byte of SIMD operands A 1502 and B 1504, respectively. Each of conditional bit reversal circuits 1506 and 1508 can be implemented with a conditional bit reversal circuit 1100 as described above with reference to FIG. 11.

SIMD carryless multiplication circuit 1500 additionally includes two 128-bit SIMD multiply-multiply engines 1512, 1514, each of which can be implemented, for example, with the prior art multiply-multiply engine 1400 of FIG. 14. Multiply-multiply engine 1512 multiplies operands 1502, 1504 (i.e., AH,AL and BH,BL) to generate a 255-bit product P1 including a 127-bit high part P1H and a 128-bit low part P1L. The exclusive OR of P1H and P1L is result Q1. To compensate for data format differences between BBE and LLE, bit 0 is dropped from P1H to achieve a 1-bit left shift. Multiply-multiply engine 1514 has a first input coupled to receive SIMD operand A 1502 (i.e., AH. AL) and a second input coupled to receive the output of swap double words circuit 1510, which swaps the high and low 64-bit double words of SIMD operand B 1504 (i.e., BL,BH). Multiply-multiply engine 1514 multiplies and combines these two inputs in a carryless fashion to generate a 128-bit result Q2 (where Q2 corresponds to AL*BH+AH*BL, that is, to the 128b result of a 64-bit multiply-multiply operation with a reversed B operand).

SIMD carryless multiplication circuit 1500 additionally includes a reducing circuit 1516 that reduces the 255-bit product P, derived from result Q2 and the partial products P1L,P1H, to 128 bits and a multiplexer 1518 that selects between 128-bit result Q1 and the 128-bit output of reducing circuit 1516 as the result 1520 of SIMD carryless multiplication circuit 1500. As further shown in FIG. 15, reducing circuit 1516 logically combines products P1H, P1L, and Q2 utilizing a left-aligned 255-bit bitwise XOR circuit 1534 that takes three inputs: 127-bit P1H, a 255-bit value obtained by applying a 127-bit rightward shift to P1L utilizing shift circuit 1530, and a 191-bit value obtained by applying a 63-bit rightward shift to Q2 utilizing shift circuit 1532. These three inputs as left-aligned are logically combined by bitwise XOR circuit 1534 to generate a 255-bit carryless product P. This 255-bit carryless product P is reduced to a 128-bit reduced product M by a modular reduction circuit 1010 as previously described with reference to FIG. 10. The bit ordering within each byte of reduced product M is conditionally reversed by conditional bit reversal circuit 1536 to produce a 128-bit output that forms the second input of multiplexer 1518. Multiplexer 1518 selects result Q1 as result 1520 if SIMD carryless multiplication circuit 1500 is utilized to execute a SIMD multiplication instruction and selects the output of reducing circuit 1516 as result 1520 if SIMD carryless multiplication circuit 1500 is utilized to execute a Galois multiplication instruction.

Those skilled in the art will appreciate that SIMD carryless multiplication circuit 1500 employs optimizations (and can employ additional optimizations) to reduce circuit size. For example, SIMD carryless multiplication circuit 1500 can employ the Karatsuba algorithm to reduce the computation of AH*BL+AL*BH to (AH+AL)*(BH+BL)+PH+PL. This simplification can be computed by one 64-bit carryless multiplier, two 64-bit bitwise XOR circuits operating on operands A and B, and a three-way 128-bit XOR on the three product terms. Further optimization can be performed by combining conditional bit reversal circuits 1506, 1508 and swap double words circuit 1510 and by combining condition bit reversal circuit 1536 with multiplexer 1518. In general, if the Karatsuba algorithm is implemented for 128-bit SIMD, carryless multiply circuit 404 of FIG. 10 can be implemented in no more than 1.5 times the area of multiply-multiply engine 1400 of FIG. 14, and SIMD carryless multiplication circuit 1500 of FIG. 15 can be implemented in no more than two times the area of multiply-multiply engine 1400. If a 64-bit multiply-multiply engine is employed in 256-bit or higher SID, a 128-bit Galois multiplication can be implemented with even less hardware overhead. The two 128-bit multiply-multiply engines in such a 256-bit SIMD engine can be combined along the lines of FIG. 15 to perform a 128-bit Galois multiply on high or low 128-bit SIMD elements. The only overhead is the multiplexing and conditional bit reversion of the operands for the Galois multiply and the reducing circuit 1516.

Referring now to FIG. 16, there is depicted a high-level logical flowchart of an exemplary method of Galois multiplication in accordance with one embodiment. For ease of understanding, the process of FIG. 16 is described with reference to the embodiment of carryless multiply circuit 404 given in FIG. 10.

The illustrated process begins at block 1600 and then proceeds to block 1602, which illustrates vector-scalar unit 226 of a processor core 200 receiving an instruction requiring Galois multiplication, such as Galois multiplication instruction 1300 of FIG. 13. In response to receipt of the instruction, vector-scalar unit 226 reads out operands A and B from architected register file 300 and passes operands A and B to the input ports of carryless multiply circuit 404 (block 1604). At block 1606, vector-scalar unit 226 determines whether or not the instruction specifies (e.g., in mode field 1306) a XTS mode requiring the BLE data format rather than the LLE data format. In response to an affirmative determination at block 1606, vector-scalar unit 226 reverses the ordering of bits in each byte of operands A and B utilizing conditional bit reversal circuits 1002*a*, 1002*b* of carryless multiply circuit 404 (block 1608).

Following block 1608 or in response to a negative determination at block 1606, vector-scalar unit 226 performs a carryless multiplication of operands A and B utilizing carryless multiplier 1006 to obtain a 255-bit product P 1008 (block 1610). The multiplication employs a BBE data format. At block 1612, vector-scalar unit 226 reduces product P according to polynomial g(x) to obtain reduced product M 618 through two or more bitwise XOR stages, as shown in FIG. 12. As shown at blocks 1614-1616, if the instruction specifies the XTS mode requiring BLE data format rather than the LLE data format, vector-scalar unit 226 again reverses the bit ordering in each byte of reduced product M 618 utilizing conditional bit reversal circuit 1002*c*. Following block 1616 or if the instruction does not specify the XTS mode, vector-scalar unit 226 writes reduced product M back to register file 300 (block 1618). Following block 1618, the process of FIG. 16 ends at block 1620.

Figure 17:
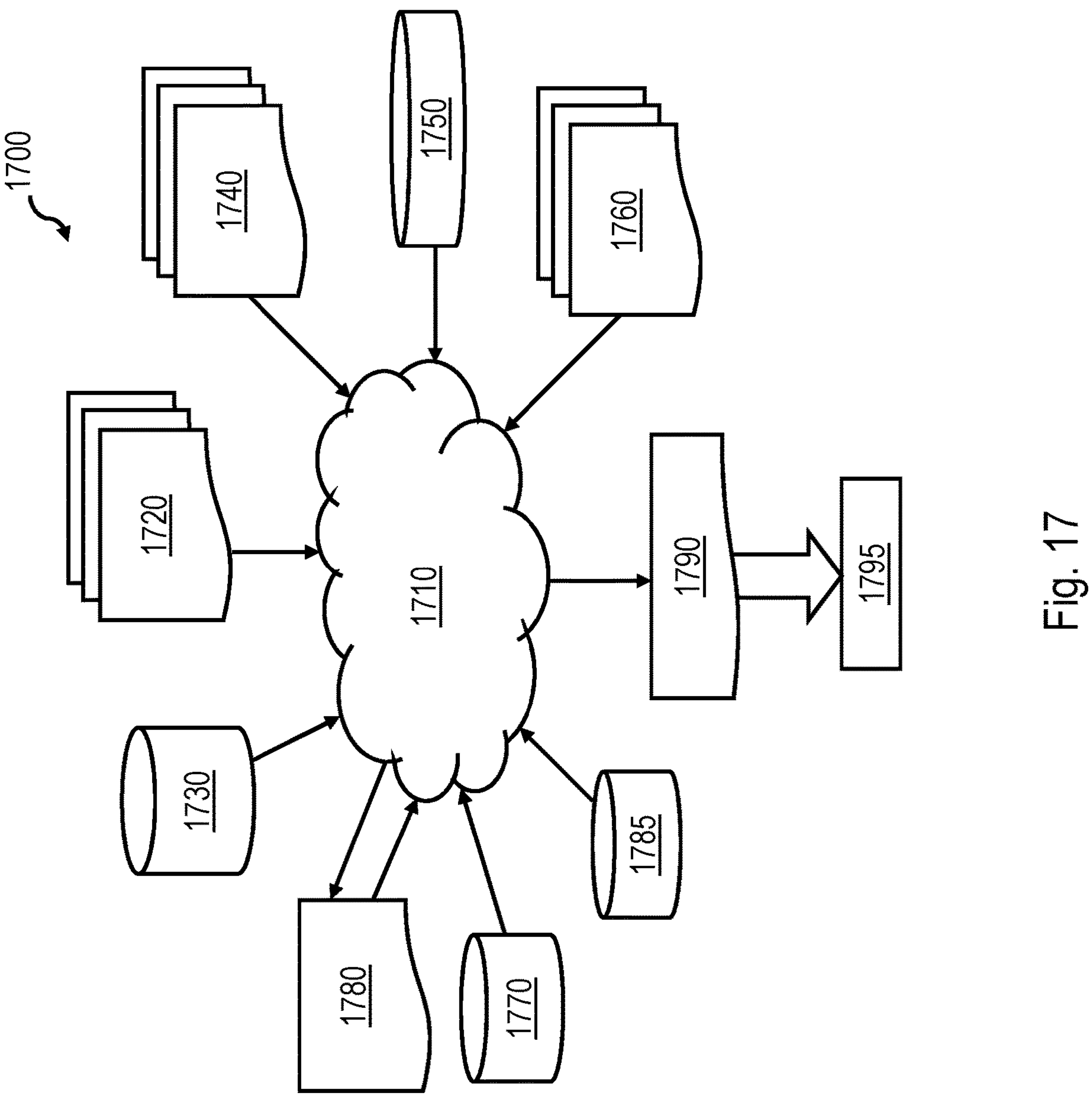
FIG. 17 depicts an exemplary design process in accordance with one embodiment.

With reference now to FIG. 17, there is illustrated a block diagram of an exemplary design flow 1700 used for example, in semiconductor IC logic design, simulation, test, layout, and manufacture. Design flow 1700 includes processes, machines and/or mechanisms for processing design structures or devices to generate logically or otherwise functionally equivalent representations of the design structures and/or devices described above and shown herein. The design structures processed and/or generated by design flow 1700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1700 may vary depending on the type of representation being designed. For example, a design flow 1700 for building an application specific IC (ASIC) may differ from a design flow 1700 for designing a standard component or from a design flow 1700 for instantiating the design into a programmable array, for example a programmable gate array (PGA) or a field programmable gate array (FPGA) offered by Altera® Inc. or Xilinx® Inc.

FIG. 17 illustrates multiple such design structures including an input design structure 1020 that is preferably processed by a design process 1710. Design structure 1720 may be a logical simulation design structure generated and processed by design process 1710 to produce a logically equivalent functional representation of a hardware device. Design structure 1720 may also or alternatively comprise data and/or program instructions that when processed by design process 1710, generate a functional representation of the physical structure of a hardware device. Whether representing functional and/or structural design features, design structure 1720 may be generated using electronic computer-aided design (ECAD) such as implemented by a core developer/designer. When encoded on a machine-readable data transmission, gate array, or storage medium, design structure 1720 may be accessed and processed by one or more hardware and/or software modules within design process 1710 to simulate or otherwise functionally represent an electronic component, circuit, electronic or logic module, apparatus, device, or system such as those shown herein. As such, design structure 1720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher-level design languages such as C or C++.

Design process 1710 preferably employs and incorporates hardware and/or software modules for synthesizing, translating, or otherwise processing a design/simulation functional equivalent of the components, circuits, devices, or logic structures shown herein to generate a netlist 1780 which may contain design structures such as design structure 1720. Netlist 1780 may comprise, for example, compiled or otherwise processed data structures representing a list of wires, discrete components, logic gates, control circuits, I/O devices, models, etc. that describes the connections to other elements and circuits in an integrated circuit design. Netlist 1780 may be synthesized using an iterative process in which netlist 1780 is resynthesized one or more times depending on design specifications and parameters for the device. As with other design structure types described herein, netlist 1780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1710 may include hardware and software modules for processing a variety of input data structure types including netlist 1780. Such data structure types may reside, for example, within library elements 1730 and include a set of commonly used elements, circuits, and devices, including models, layouts, and symbolic representations, for a given manufacturing technology (e.g., different technology nodes, 32 nm, 45 nm, 170 nm, etc.). The data structure types may further include design specifications 1740, characterization data 1750, verification data 1760, design rules 1790, and test data files 1785 which may include input test patterns, output test results, and other testing information. Design process 1710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1710 without deviating from the scope and spirit of the invention. Design process 1710 may also include modules for performing standard circuit design processes such as timing analysis, verification, design rule checking, place and route operations, etc.

Design process 1710 employs and incorporates logic and physical design tools such as HDL compilers and simulation model build tools to process design structure 1720 together with some or all of the depicted supporting data structures along with any additional mechanical design or data (if applicable), to generate a second design structure 1790. Design structure 1790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1720, design structure 1790 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1790 may comprise a compiled, executable HDL simulation model that functionally simulates the devices shown herein.

Design structure 1790 may also employ a data format used for the exchange of layout data of integrated circuits and/or symbolic data format (e.g., information stored in a GDSII (GDS2), GL1, OASIS, map files, or any other suitable format for storing such design data structures). Design structure 1790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1790 may then proceed to a stage 1795 where, for example, design structure 1790: proceeds to tape-out, is released to manufacturing, is released to a mask house, is sent to another design house, is sent back to the customer, etc.

As has been described, in at least one embodiment, a processor includes an instruction fetch unit that fetches instructions to be executed, an architected register file including a plurality of registers for storing source and destination operands, and an execution unit for executing a Galois multiply instruction. The execution unit includes a carryless multiplier configured to multiply operands of the Galois multiply instruction to generate a product. The execution unit further includes a modular reduction circuit configured to receive the product and determine, based on a logical combination of the product and a fixed polynomial, a reduced product having a fewer number of bits than the product. The execution unit is configured to store the reduced product to the architected register file as a result of the Galois multiply instruction.

In some embodiments, the processor can form part of a larger data processing system or can be implemented as a design structure embodied in a machine-readable storage device.

According to one method of data processing, an instruction fetch unit of a processor fetches instructions to be executed by the processor, including a Galois multiply instruction. Based on receiving the Galois multiply instruction, an execution unit of the processor executes the Galois multiply instruction. Executing the Galois multiply instruction includes multiplying, by a carryless multiplier, operands of the Galois multiply instruction to generate a product. Executing the instruction further includes a modular reduction circuit receiving the product and determining, based on a logical combination of the product and a fixed polynomial, a reduced product having a fewer number of bits than the product. The processor then stores the reduced product to an architected register file of the processor as a result of the Galois multiply instruction.

In at least one embodiment, the fixed polynomial is g(x)=1+X+x^2+x^7+x^128.

In at least one embodiment, the product of the carryless multiplication includes a high part including high-order bits of the product and a low part including low-order bits of the product, and the modular reduction circuit is configured to compute a first result equivalent to a carryless multiplication of the high part and the fixed polynomial. The modular reduction circuit includes shift circuitry that applies multiple different bit position shifts to the high part of the product consistent with asserted bits in the fixed polynomial and bitwise exclusive OR (XOR) circuitry that logically combines multiple instances of the high part of the product having different respective bit position shifts applied by the shift circuitry.

In at least one embodiment, the shift circuitry is further configured to apply multiple different bit position shifts to the high part of the first result consistent with asserted bits in the fixed polynomial, and the bitwise exclusive OR (XOR) circuitry is further configured to logically combine multiple instances of the high part of the first result having different respective bit position shifts applied by the shift circuitry to obtain a second result. The bitwise XOR circuitry generates the reduced product based on the first result, the second result, and the low part of the product.

In at least one embodiment, the bitwise exclusive OR (XOR) circuitry includes at least two stages of bitwise XOR circuitry.

In at least one embodiment, the processor includes a conditional bit reversal circuit configured to, prior to multiplication of the operands, conditionally reverse a bit ordering of bytes in one of the operands based on a mode indicated by the Galois multiply instruction.

In at least one embodiment, the carryless multiplier is a first multiply-multiply engine, the execution unit includes a second multiply-multiply engine, the first and second carryless multiply-multiply engines both have a first data width, and the operands include first and second operands having a second data width that is an integer multiple of the first data width. In this case, the first and second multiply-multiply engines are configured to multiply subsets of the first and second operands in parallel.

While various embodiments have been particularly shown and described, it will be understood by those skilled in the art that various changes in form and detail may be made therein without departing from the spirit and scope of the appended claims and these alternate implementations all fall within the scope of the appended claims. For example, while the invention has been described with reference to specific cryptographic algorithms (e.g., AES, GCM, XTS) and data widths, those skilled in the art will appreciate that the disclosed inventions are also applicable to other encryption algorithms and data widths.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher-level design languages such as C or C++. Furthermore, the data and/or instructions may also employ a data format used for the exchange of layout data of integrated circuits and/or symbolic data format (e.g., information stored in a GDSII (GDS2), GL1, OASIS, map files, or any other suitable format for storing such design data structures).

What is claimed is:

1. A processor, comprising:

an instruction fetch unit that fetches instructions to be executed;

an architected register file including a plurality of registers for storing source and destination operands; and an execution unit for executing a Galois multiply instruction, the Galois multiply instruction including a mode field that specifies a data format applicable to a Galois carryless multiplication and modular reduction operation, wherein the execution unit includes:

a carryless multiplier configured to multiply operands of the Galois multiply instruction to generate a product; and a modular reduction circuit configured to receive the product and determine, based on a logical combination of the product and a fixed polynomial, a reduced product having a fewer number of bits than the product, wherein the execution unit is configured to store the reduced product to the architected register file as a result of the Galois multiply instruction, and wherein the execution unit executes the Galois multiply instruction based on the data format specified by the mode field.

2. The processor of claim 1, wherein the fixed polynomial is g (x)=1+X+x^2+x^7+x^128.

3. The processor of claim 1, wherein:

the product includes a high part including high-order bits of the product and a low part including low-order bits of the product;

the modular reduction circuit is configured to compute a first result equivalent to a carryless multiplication of the high part and the fixed polynomial, wherein the modular reduction circuit includes:

shift circuitry that applies multiple different bit position shifts to the high part of the product consistent with asserted bits in the fixed polynomial; and bitwise exclusive OR (XOR) circuitry that logically combines multiple instances of the high part of the product having different respective bit position shifts applied by the shift circuitry.

4. The processor of claim 3, wherein:

the shift circuitry is further configured to apply multiple different bit position shifts to the high part of the first result consistent with the asserted bits in the fixed polynomial;

the bitwise exclusive OR (XOR) circuitry is further configured to logically combine multiple instances of the high part of the first result having the different respective bit position shifts applied by the shift circuitry to obtain a second result, wherein the bitwise XOR circuitry generates the reduced product based on the first result, the second result, and the low part of the product.

5. The processor of claim 3, wherein the bitwise exclusive OR (XOR) circuitry includes at least two stages of bitwise XOR circuitry.

6. The processor of claim 1, further comprising:

a conditional bit reversal circuit configured to, prior to multiplication of the operands, conditionally reverse a bit ordering of bytes in one of the operands based on an endianness mode indicated by the Galois multiply instruction.

7. The processor of claim 1, wherein:

the carryless multiplier is a first multiply-multiply engine;

the execution unit includes a second multiply-multiply engine, wherein the first and second multiply-multiply engines have a first data width;

the operands include first and second operands having a second data width that is an integer multiple of the first data width; and the first and second multiply-multiply engines are configured to multiply subsets of the first and second operands in parallel.

8. A data processing system, comprising:

multiple processors, including the processor of claim 1;

a shared memory; and a system interconnect communicatively coupling the shared memory and the multiple processors.

9. A method of data processing in a processor, said method comprising:

fetching, by an instruction fetch unit, instructions to be executed by the processor, wherein the instructions include a Galois multiply instruction including a mode field that specifies a data format applicable to a Galois carryless multiplication and modular reduction operation; and based on receiving the Galois multiply instruction, an execution unit of the processor executing the Galois multiply instruction based on the data format specified by the mode field, wherein the executing includes:

multiplying, by a carryless multiplier, operands of the Galois multiply instruction to generate a product;

a modular reduction circuit receiving the product and determining, based on a logical combination of the product and a fixed polynomial, a reduced product having a fewer number of bits than the product; and storing the reduced product to an architected register file of the processor as a result of the Galois multiply instruction.

10. The method of claim 9, wherein the fixed polynomial is g (x)=1+X+x^2+x^7+x^128.

11. The method of claim 9, wherein:

the product includes a high part including high-order bits of the product and a low part including low-order bits of the product;

determining the reduced product includes computing a first result equivalent to a carryless multiplication of the high part and the fixed polynomial, wherein the computing includes:

applying, by shift circuitry, multiple different bit position shifts to the high part of the product consistent with asserted bits in the fixed polynomial; and logically combining, by bitwise exclusive OR (XOR) circuitry, multiple instances of the high part of the product having different respective bit position shifts applied by the shift circuitry.

12. The method of claim 11, further comprising:

applying, by the shift circuitry, multiple different bit position shifts to the high part of the first result consistent with the asserted bits in the fixed polynomial; and logically combining, by the bitwise exclusive OR (XOR) circuitry, multiple instances of the high part of the first result having the different respective bit position shifts applied by the shift circuitry to obtain a second result;

wherein determining the reduced product comprises determining the reduced product based on the first result, the second result, and the low part of the product.

13. The method of claim 9, further comprising:

prior to multiplication of the operands, conditionally reversing a bit ordering of bytes in one of the operands based on an endianness mode indicated by the Galois multiply instruction.

14. The method of claim 9, wherein:

the carryless multiplier is a first multiply-multiply engine;

the execution unit includes a second multiply-multiply engine, wherein the first and second multiply-multiply engines have a first data width;

the operands include first and second operands having a second data width that is an integer multiple of the first data width; and multiplying the operands includes the first and second multiply-multiply engines multiplying subsets of the first and second operands in parallel.

15. A design structure tangibly embodied in a machine-readable storage device for designing, manufacturing, or testing an integrated circuit, the design structure comprising:

a processor, including:

an instruction fetch unit that fetches instructions to be executed;

an architected register file including a plurality of registers for storing source and destination operands; and an execution unit for executing a Galois multiply instruction, the Galois multiply instruction including a mode field that specifies a data format applicable to a Galois carryless multiplication and modular reduction operation, wherein the execution unit includes:

a carryless multiplier configured to multiply operands of the Galois multiply instruction to generate a product; and a modular reduction circuit configured to receive the product and determine, based on a logical combination of the product and a fixed polynomial, a reduced product having a fewer number of bits than the product, wherein the execution unit is configured to store the reduced product to the architected register file as a result of the Galois multiply instruction, and wherein the execution unit executes the Galois multiply instruction based on the data format specified by the mode field.

16. The design structure of claim 15, wherein the fixed polynomial is g (x)=1+X+x^2+x^7+x^128.

17. The design structure of claim 15, wherein:

the product includes a high part including high-order bits of the product and a low part including low-order bits of the product;

the modular reduction circuit is configured to compute a first result equivalent to a carryless multiplication of the high part and the fixed polynomial, wherein the modular reduction circuit includes:

shift circuitry that applies multiple different bit position shifts to the high part of the product consistent with asserted bits in the fixed polynomial; and bitwise exclusive OR (XOR) circuitry that logically combines multiple instances of the high part of the product having different respective bit position shifts applied by the shift circuitry.

18. The design structure of claim 17, wherein:

the shift circuitry is further configured to apply multiple different bit position shifts to the high part of the first result consistent with the asserted bits in the fixed polynomial;

the bitwise exclusive OR (XOR) circuitry is further configured to logically combine multiple instances of the high part of the first result having the different respective bit position shifts applied by the shift circuitry to obtain a second result, wherein the bitwise XOR circuitry generates the reduced product based on the first result, the second result, and the low part of the product.

19. The design structure of claim 15, further comprising:

a conditional bit reversal circuit configured to, prior to multiplication of the operands, conditionally reverse a bit ordering of bytes in one of the operands based on an endianness mode indicated by the Galois multiply instruction.

20. The design structure of claim 15, wherein:

the carryless multiplier is a first multiply-multiply engine;

the execution unit includes a second multiply-multiply engine, wherein the first and second multiply-multiply engines have a first data width;

the operands include first and second operands having a second data width that is an integer multiple of the first data width; and the first and second multiply-multiply engines are configured to multiply subsets of the first and second operands in parallel.

* * * * *